United States Patent
Jia et al.

(10) Patent No.: US 10,892,829 B2
(45) Date of Patent: Jan. 12, 2021

(54) SYSTEMS AND METHODS FOR FULL DUPLEX COHERENT OPTICS

(71) Applicant: CABLE TELEVISION LABORATORIES, INC, Louisville, CO (US)

(72) Inventors: Zhensheng Jia, Superior, CO (US); Luis Alberto Campos, Superior, CO (US); Jing Wang, Broomfield, CO (US)

(73) Assignee: Cable Television Laboratories, Inc, Louisville, CO (US)

( * ) Notice: Subject to any disclaimer, the term of this patent is extended or adjusted under 35 U.S.C. 154(b) by 0 days.

(21) Appl. No.: 16/198,396

(22) Filed: Nov. 21, 2018

(65) Prior Publication Data

US 2019/0158182 A1 May 23, 2019

Related U.S. Application Data

(60) Provisional application No. 62/589,121, filed on Nov. 21, 2017, provisional application No. 62/636,249, filed on Feb. 28, 2018.

(51) Int. Cl.
| | |
|---|---|
| *H04B 10/40* | (2013.01) |
| *H04B 10/25* | (2013.01) |
| *H04B 10/27* | (2013.01) |
| *H04J 14/02* | (2006.01) |
| *H04B 10/61* | (2013.01) |

(52) U.S. Cl.
CPC ............. *H04B 10/40* (2013.01); *H04B 10/25* (2013.01); *H04B 10/2589* (2020.05); *H04B 10/27* (2013.01); *H04B 10/61* (2013.01); *H04J 14/02* (2013.01)

(58) Field of Classification Search
CPC ........ H04B 10/40; H04B 10/25; H04B 10/27; H04J 14/02
See application file for complete search history.

(56) References Cited

U.S. PATENT DOCUMENTS

| | | | | |
|---|---|---|---|---|
| 7,474,460 B2 * | 1/2009 | Fujiwara | ............ | H04B 10/2587 359/237 |
| 8,131,156 B2 * | 3/2012 | Yu | ....................... | H04B 10/2587 398/168 |
| 9,143,234 B2 * | 9/2015 | Campos | ................. | H04B 10/27 |
| 9,300,399 B2 * | 3/2016 | Campos | ............ | H04B 10/2504 |

(Continued)

*Primary Examiner* — Mina M Shalaby
(74) *Attorney, Agent, or Firm* — Armstrong Teasdale LLP

(57) ABSTRACT

A communication network includes an optical hub having a first coherent optics transceiver, a fiber node having a second coherent optics transceiver, an optical transport medium operably coupling the first coherent optics transceiver to the second coherent optics transceiver, a first optical circulator disposed at the optical hub, and a second optical circulator disposed at the fiber node. The first coherent optics transceiver is configured to (i) transmit a downstream optical signal at a first wavelength, and (ii) receive an upstream optical signal at the first wavelength. The second coherent optics transceiver is configured to (i) receive the downstream optical signal from the first coherent optics transceiver at the first wavelength, and (ii) transmit the upstream optical signal at the first wavelength. The first and second optical circulators are configured to separate the downstream optical signal from the upstream optical signal.

20 Claims, 23 Drawing Sheets

(56) References Cited

U.S. PATENT DOCUMENTS

| | | | |
|---|---|---|---|
| 9,912,409 B2* | 3/2018 | Jia | H04B 10/506 |
| 2004/0213574 A1* | 10/2004 | Han | H04J 14/02 |
| | | | 398/71 |
| 2006/0093360 A1* | 5/2006 | Kim | H04B 10/2587 |
| | | | 398/71 |
| 2008/0317468 A1* | 12/2008 | Villarruel | H04J 14/0282 |
| | | | 398/68 |
| 2010/0142950 A1* | 6/2010 | Pincemin | H04B 10/2513 |
| | | | 398/58 |
| 2010/0215368 A1* | 8/2010 | Qian | H04J 14/0282 |
| | | | 398/67 |
| 2010/0278535 A1* | 11/2010 | Kim | H04B 10/272 |
| | | | 398/72 |
| 2010/0329680 A1* | 12/2010 | Presi | H04B 10/2587 |
| | | | 398/79 |
| 2011/0026923 A1* | 2/2011 | Kim | H01S 5/50 |
| | | | 398/79 |

* cited by examiner

SYSTEMS AND METHODS FOR FULL DUPLEX COHERENT OPTICS

CROSS REFERENCE TO RELATED APPLICATIONS

This application claims the benefit of and priority to U.S. Provisional Patent Application Ser. No. 62/589,121, filed Nov. 21, 2017, and to U.S. Provisional Patent Application Ser. No. 62/636,249, filed Feb. 28, 2017, both of which are incorporated herein by reference in their entireties.

BACKGROUND

The field of the disclosure relates generally to communication networks, and more particularly, to bidirectional networks employing coherent optics technologies.

Most network operators have very limited fiber available between the headend (HE)/hub and the fiber node to use for data and video services, often only just 1-2 fiber strands. With end users demanding more bandwidth to the home, operators need a strategy on how to increase capacity in the access network. One way is to add more fiber between the HE/hub and the fiber node, but retrenching is costly and time consuming, so return on investment (RoI) makes this option unattractive. A solution that re-uses the existing infrastructure is therefore considerably preferable.

Coherent optics technology is becoming common in the subsea, long-haul, and metro networks, but has not yet been fully integrated into the access networks. However, it is desirable to utilize coherent optics technology in the access network because the distances from the HE/hub to the fiber node are much shorter using coherent optics technologies in comparison with conventional system technologies. One proposed technique for expanding the capacity of existing fiber infrastructures implements coherent optics bidirectional transmission on a single fiber. Bidirectional transmission effectively doubles (or more) the amount of transmission capability available to cable operators.

Bidirectional transmission is attractive to network operators that have limited availability of leased or owned fibers, and who desire separation of different services (residential, business, and cellular connections) to end users/endpoints of the network. However, existing coherent transceiver designs have been unable to fully leverage the capabilities of bidirectional transmission. In particular, conventional implementations of single laser sources for both the transmitter and the local oscillator (LO) result in significant crosstalk that has prevented bidirectional transmission. Accordingly, it is desirable to develop systems and methods that successfully implement coherent optics technology in bidirectional transmission between the hub and the fiber node.

SUMMARY

In an embodiment, a communication network, includes an optical hub having a first coherent optics transceiver, a fiber node having a second coherent optics transceiver, an optical transport medium operably coupling the first coherent optics transceiver to the second coherent optics transceiver, a first optical circulator disposed at the optical hub, and a second optical circulator disposed at the fiber node. The first coherent optics transceiver is configured to (i) transmit a downstream optical signal at a first wavelength, and (ii) receive an upstream optical signal at the first wavelength. The second coherent optics transceiver is configured to (i) receive the downstream optical signal from the first coherent optics transceiver at the first wavelength, and (ii) transmit the upstream optical signal at the first wavelength. The first and second optical circulators are configured to separate the downstream optical signal from the upstream optical signal.

BRIEF DESCRIPTION

These and other features, aspects, and advantages of the present disclosure will become better understood when the following detailed description is read with reference to the accompanying drawings in which like characters represent like parts throughout the drawings, wherein.

Figure 1:
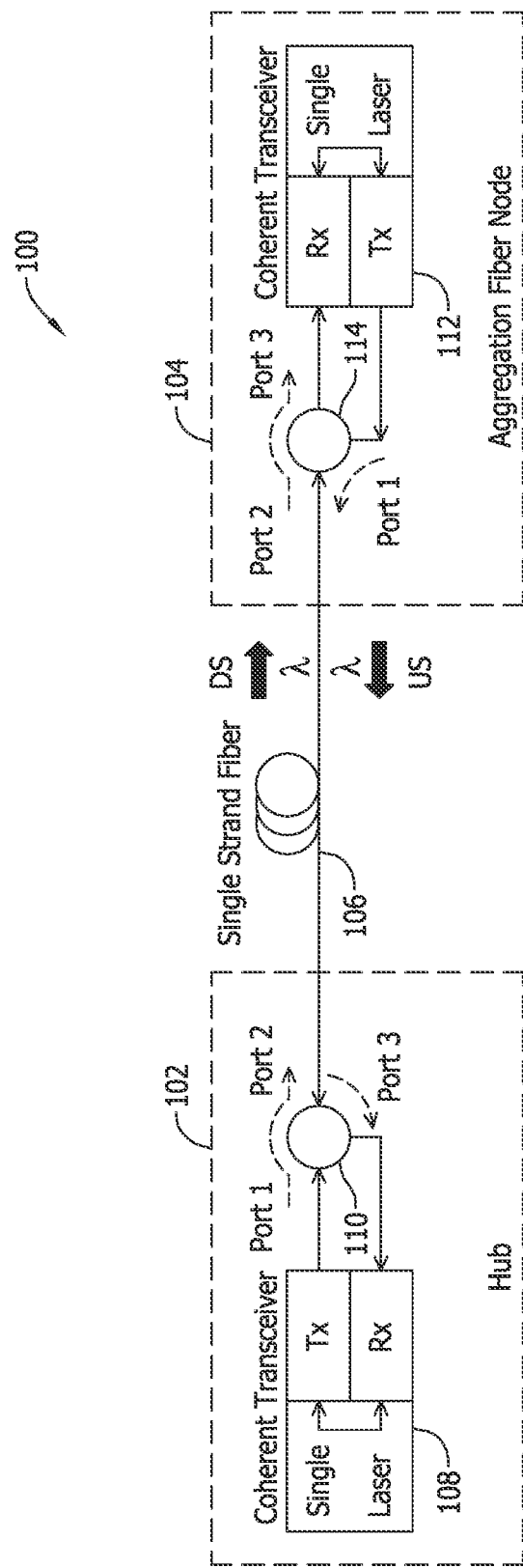
FIG. 1 is a schematic illustration of a coherent optics network architecture.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

As used herein, unless specified to the contrary, "modem termination system," or "MTS'" may refer to one or more of a cable modem termination system (CMTS), an optical network terminal (ONT), an optical line terminal (OLT), a network termination unit, a satellite termination unit, and/or other termination devices and systems. Similarly, "modem" may refer to one or more of a cable modem (CM), an optical network unit (ONU), a digital subscriber line (DSL) unit/modem, a satellite modem, etc.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The embodiments described herein provide innovative systems and methods for full-duplex coherent optics, that is, bidirectional (BiDi) coherent optics networks. The present techniques may further advantageously implement passive optical circulators and a variety of versatile architectural configurations to separate the upstream and downstream signal flows of the BiDi network. According to these embodiments, spectral efficiency is significantly improved in both the downstream and upstream directions. As described further herein, both the downstream and upstream transmissions may utilize the same wavelength and simultaneous transmission over the same fiber, thereby doubling the spectral efficiency of existing coherent transmission systems or networks.

FIG. 1 is a schematic illustration of a coherent optics network architecture 100. In the example depicted in FIG. 1, architecture 100 represents an aggregation use case for a distributed coherent optics network. Architecture 100 includes a hub 102, a node 104, and a transport medium 106 (e.g., an optical fiber) communicatively coupled therebetween. In an exemplary embodiment, transport medium 106 is a single strand fiber for a coherent optic link. Architecture 100 further includes a hub coherent transceiver 108 and a hub optical circulator 110 (e.g., a three-port optical circulator in the illustrated example) at hub 102. Similarly, architecture 100 includes a node coherent transceiver 112 and a node optical circulator 114.

In an exemplary embodiment, coherent transceivers 108, 112 include a single laser source, a transmitting portion, and a receiving portion, respectively (not separately numbered). In operation, architecture 100 is configured for bidirectional transmission of a wavelength λ in both the downstream (DS) and upstream (US) directions. In particular, architecture 100 represents transmission over a single channel (e.g., 100G, 200G, etc.), where both coherent transceivers 108, 112 use their respective single laser sources for both transmitter LO and receiver LO. That is, the wavelength λ is the same for both the downstream and upstream transmission.

Exemplary architectures of coherent hub-to-node networks and systems are described in greater detail in co-pending U.S. patent application Ser. No. 15/283,632, filed Oct. 3, 2016, and co-pending U.S. patent application Ser. No. 15/590,464, filed May 9, 2017, the disclosures of both which are incorporated by reference herein. Additionally, the person of ordinary skill in the art will understand that architecture 100 is simplified for ease of explanation, does not necessarily illustrate all components that may be implemented within a hub and/or fiber node.

Figure 2:
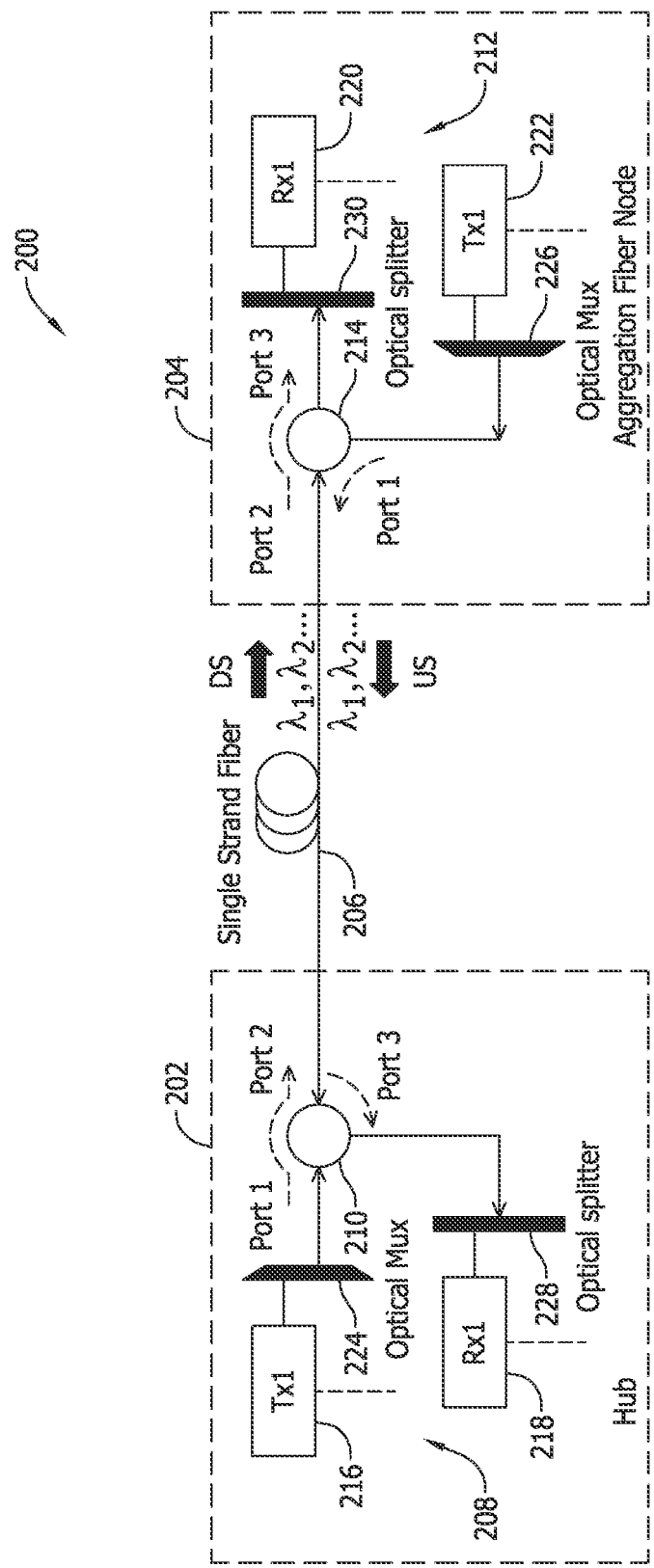
FIG. 2 is a schematic illustration of a coherent optics network architecture.

FIG. 2 is a schematic illustration of a coherent optics network architecture 200. Architecture 200 is similar to architecture 100, FIG. 1, and also represents an example of an aggregation use case. Accordingly, architecture 200 includes a hub 202, a fiber node 204, a transport medium/fiber 206, a hub coherent transceiver 208, a hub optical circulator 210, a node coherent transceiver 212, and a node optical circulator 214. In the example depicted in FIG. 2, hub coherent transceiver 208 includes a hub transmitter 216 and a separate hub receiver 218. Similarly, node coherent transceiver 212 includes a node receiver 220 and a node transmitter 222.

In an exemplary embodiment, architecture 200 is configured to implement transmission over a dense wavelength division multiplexing (DWDM) channel, and further includes a first optical splitter 228 at hub 202 and a second optical splitter 230 at node 204. In an embodiment, architecture 200 further includes a first optical multiplexer 224 at hub 202 and a second optical multiplexer 226 at node 204. In this example, architecture 200 is configured to transmit multiple wavelengths $\lambda_1, \lambda_2, \ldots \lambda_N$ in both directions. In the example depicted in FIG. 2, a demultiplexer is optionally the necessary at coherent receivers 218, 220 where the respective LO serves for signal selectivity. This embodiment may, for example, be particularly advantageous in the case of a limited number of DWDM channels.

Figure 3:
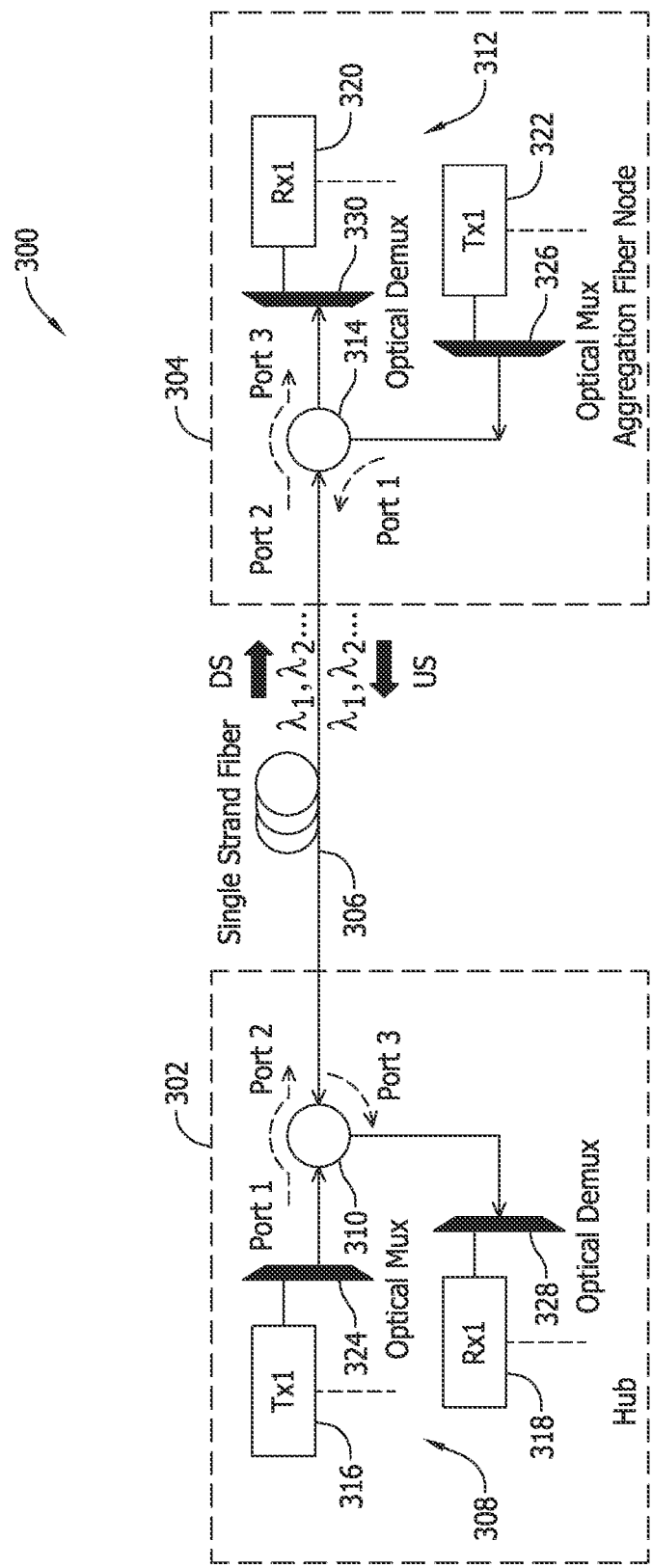
FIG. 3 is a schematic illustration of a coherent optics network architecture.

FIG. 3 is a schematic illustration of a coherent optics network architecture 300. Architecture 300 is similar to architecture 200, FIG. 2, and also represents an example of an aggregation use case and is configured to implement DWDM transmission. Accordingly, architecture 300 includes a hub 302, a fiber node 304, a transport medium/fiber 306, a hub coherent transceiver 308, a hub optical circulator 310, a node coherent transceiver 312, a node optical circulator 314, a hub transmitter 316, a hub receiver 318, a node receiver 320, a node transmitter 322, a first optical multiplexer 324, and a second optical multiplexer 326. Architecture 300 differs though, from architecture 200 in that architecture 300 further includes a first optical demultiplexer 328 at hub 302 and a second optical demultiplexer 330 at node 304. That is, architecture 300 effectively replaces first optical splitter 228 and second optical splitter 230 with first optical demultiplexer 328 and second optical demultiplexer 330, respectively.

Figure 4:
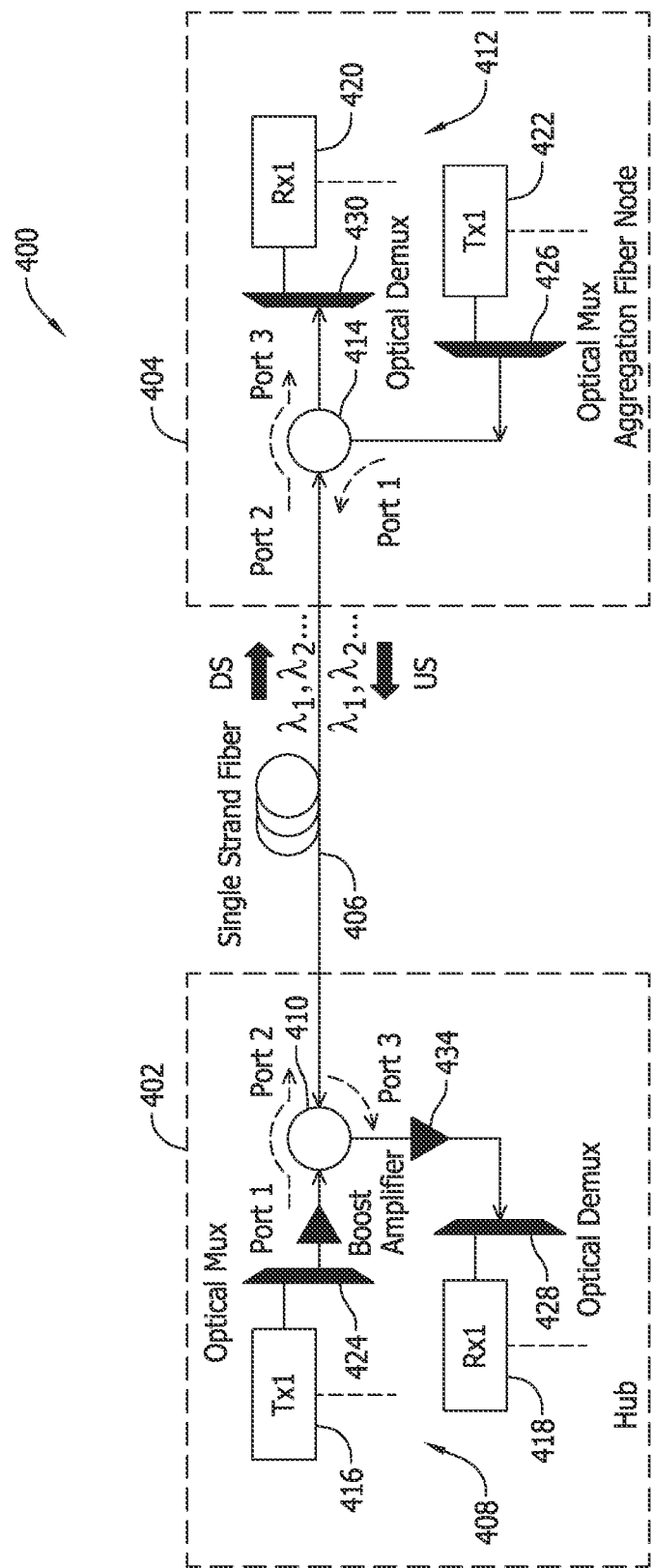
FIG. 4 is a schematic illustration of a coherent optics network architecture.

FIG. 4 is a schematic illustration of a coherent optics network architecture 400. Architecture 400 is similar to architecture 300, FIG. 3, and also represents an example of an aggregation use case for DWDM channels. Accordingly, architecture 400 includes a hub 402, a fiber node 404, a transport medium/fiber 406, a hub coherent transceiver 408, a hub optical circulator 410, a node coherent transceiver 412, a node optical circulator 414, a hub transmitter 416, a hub receiver 418, a node receiver 420, a node transmitter 422, a first optical multiplexer 424, a second optical multiplexer 426, a first optical demultiplexer 428, and a second optical demultiplexer 430. Architecture 400 differs though, from architecture 300 in that architecture 400 further includes a boost amplifier 432 between first optical multiplexer 424 and hub optical circulator 410, and a pre-amplifier 434 between hub optical circulator 410 and first optical demultiplexer 428. In an exemplary embodiment, boost amplifier 432 and pre-amplifier 434 are erbium-doped fiber amplifiers (EDFAs) functioning as optical repeater devices that boost the intensity of optical signals being carried through the fiber optic communications system of architecture 400.

Figure 5:
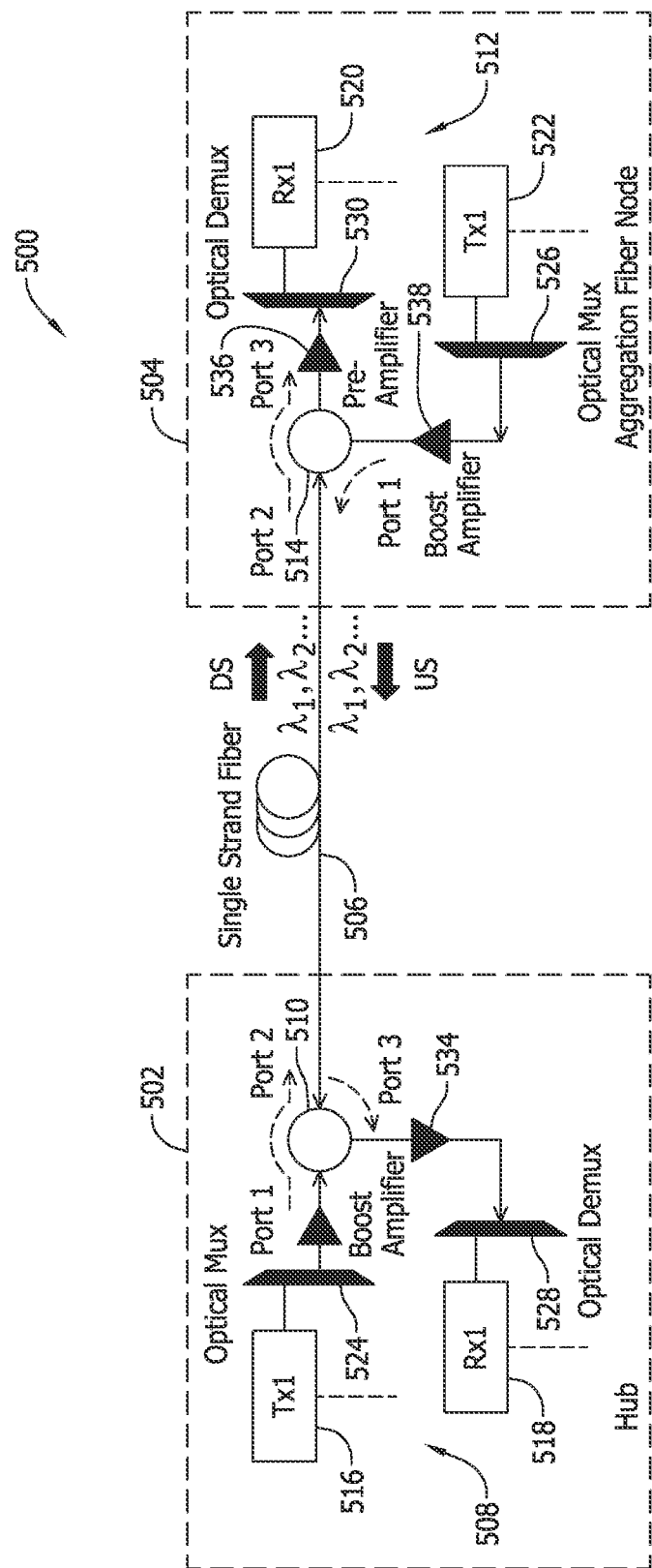
FIG. 5 is a schematic illustration of a coherent optics network architecture.

FIG. 5 is a schematic illustration of a coherent optics network architecture 500. Architecture 500 is similar to architecture 400, FIG. 4, and also represents an example of an aggregation use case for DWDM channels. Accordingly, architecture 500 includes a hub 502, a fiber node 504, a transport medium/fiber 506, a hub coherent transceiver 508, a hub optical circulator 510, a node coherent transceiver 512, a node optical circulator 514, a hub transmitter 516, a hub receiver 518, a node receiver 520, a node transmitter 522, a first optical multiplexer 524, a second optical multiplexer 526, a first optical demultiplexer 528, a second optical demultiplexer 530, a hub boost amplifier 532, and a hub pre-amplifier 534. Architecture 500 differs though, from architecture 400 in that architecture 500 further includes a node pre-amplifier 538 between node optical circulator 514 and second optical demultiplexer 530, and a node boost amplifier 538 between second optical multiplexer 526 and node optical circulator 514. In an exemplary embodiment, node pre-amplifier 536 and node boost amplifier 432 are also EDFAs.

The several architectures described herein were subject to proof of concept, which produced significant preliminary experimental results. In exemplary experimentation, forward error correction (FEC) encoding was employed (e.g., staircase FEC). Some of the FEC results reflect the use of hard decision (HD) FEC (HD-FEC) for case of 100G with 7% overhead, staircase FEC. In one particular embodiment, approximately a 1 dB power penalty was had for a 7% staircase FEC at 4.5e-3 for both directions in single channel 100G testing (single channel case).

A difference may then be seen between the upstream and downstream transmissions due to the sensitivity differences of the respective coherent receivers. However, after correction by HD-FEC techniques, no error was found over a 80-km transmission. Nevertheless, the different output powers from the respective coherent transmitters exhibits a noticeable impact on the link receiver sensitivity. Accordingly, for a particular transmission link, it is further desirable to utilize the present techniques to optimize output power to minimize the power penalty, as described further below. The experimental results described herein also consider various parameters of the respective optical circulators as featured below in Table 1.

TABLE 1

| Wavelength Range | | nm | 1525-1610 |
|---|---|---|---|
| Insertion Loss | Port 1 → 2 | dB | 0.73 |
| | Port 2 → 3 | | 0.66 |
| PDL | Port 1 → 2 | dB | 0.05 |
| | Port 2 → 3 | | 0.04 |
| Return Loss | Port 1 | dB | 60 |
| | Port 2 | | 60 |
| | Port 3 | | 60 |
| Isolation at 1570 nm | Port 2 → 1 | | 52 |
| | Port 3 → 2 | | 57 |
| Directivity | Port 1 → 3 | | 60 |
| | Port 3 → 1 | | 55 |
| PMD | | ps | <0.05 |

Figure 6:
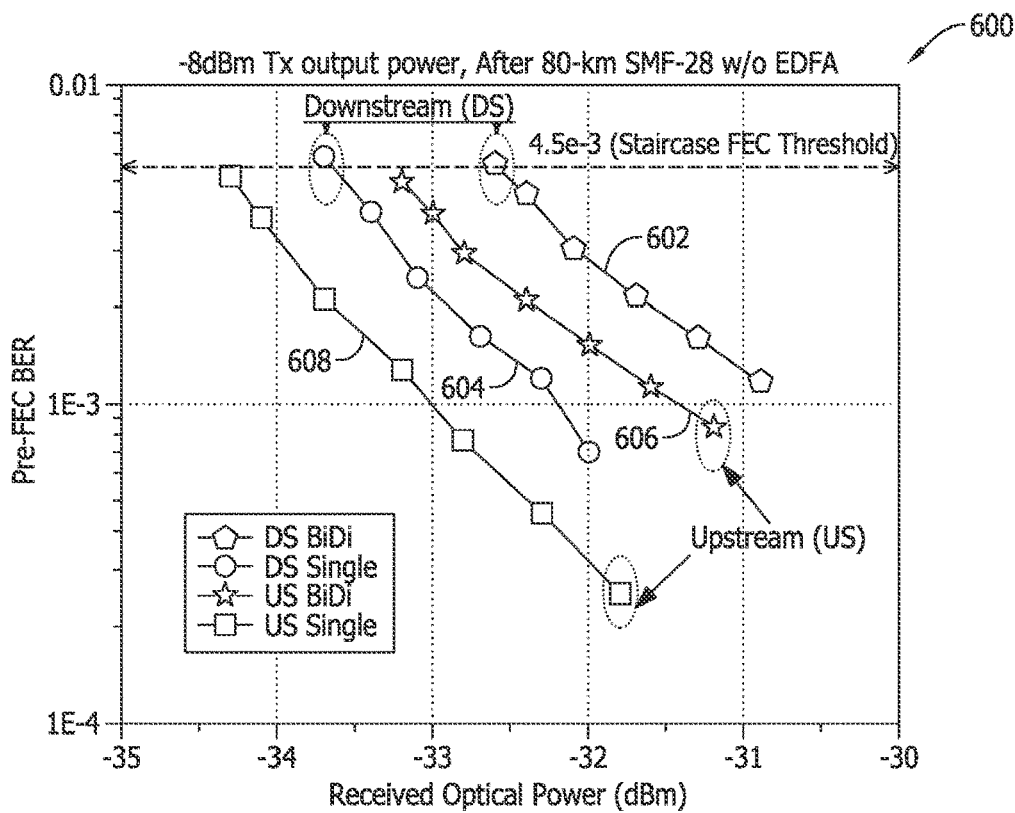
FIG. 6 is graphical illustration of a comparative plot of bit error rate against received optical power.

FIG. 6 is graphical illustration of a comparative plot 600 of bit error rate (BER) against received optical power. In an exemplary embodiment, plot 600 represents the received optical power over an 80-km single mode fiber (SMF), such as an SMF-28, and for a transmitter output power of −8 dBm (without EDFAs, in this example) and a 4.5e-3 staircase FEC threshold. Plot 600 includes a first sub-plot 602 representing a downstream transmission in a bidirectional use case, a second sub-plot 604 representing a downstream transmission in a single direction use case, a third sub-plot 606 representing an upstream transmission in the bidirectional use case, and a fourth sub-plot 608 representing an upstream transmission in the single direction use case. As can be seen from the example depicted in FIG. 6, the received optical power is consistently greater in the bidirectional case, in both the downstream and upstream directions.

Figure 7:
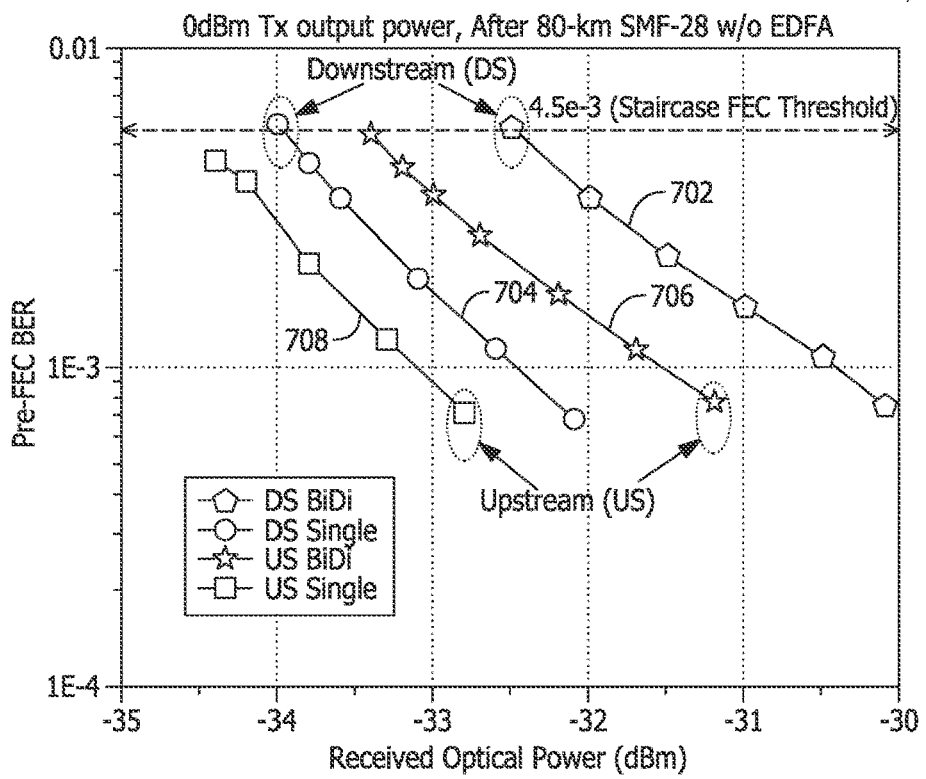
FIG. 7 is graphical illustration of a comparative plot of bit error rate against received optical power.

FIG. 7 is graphical illustration of a comparative plot 700 of BER against received optical power. Plot 700 is similar to plot 600, FIG. 6, in that plot 700 represents the received optical power over an 80-km SMF-28, a 4.5e-3 staircase FEC threshold, and without EDFA. Plot 700 differs from plot 600 though, in that plot 700 represents the experimental results for a transmitter output power of 0 dBm. Plot 700 includes a first sub-plot 702 representing a downstream transmission in the bidirectional use case, a second sub-plot 704 representing a downstream transmission in the single direction use case, a third sub-plot 706 representing an upstream transmission in the bidirectional use case, and a fourth sub-plot 708 representing an upstream transmission in the single direction use case. As can be seen from the example depicted in FIG. 7, the received optical power is again consistently greater in the bidirectional case, in both the downstream and upstream directions.

Figure 8:
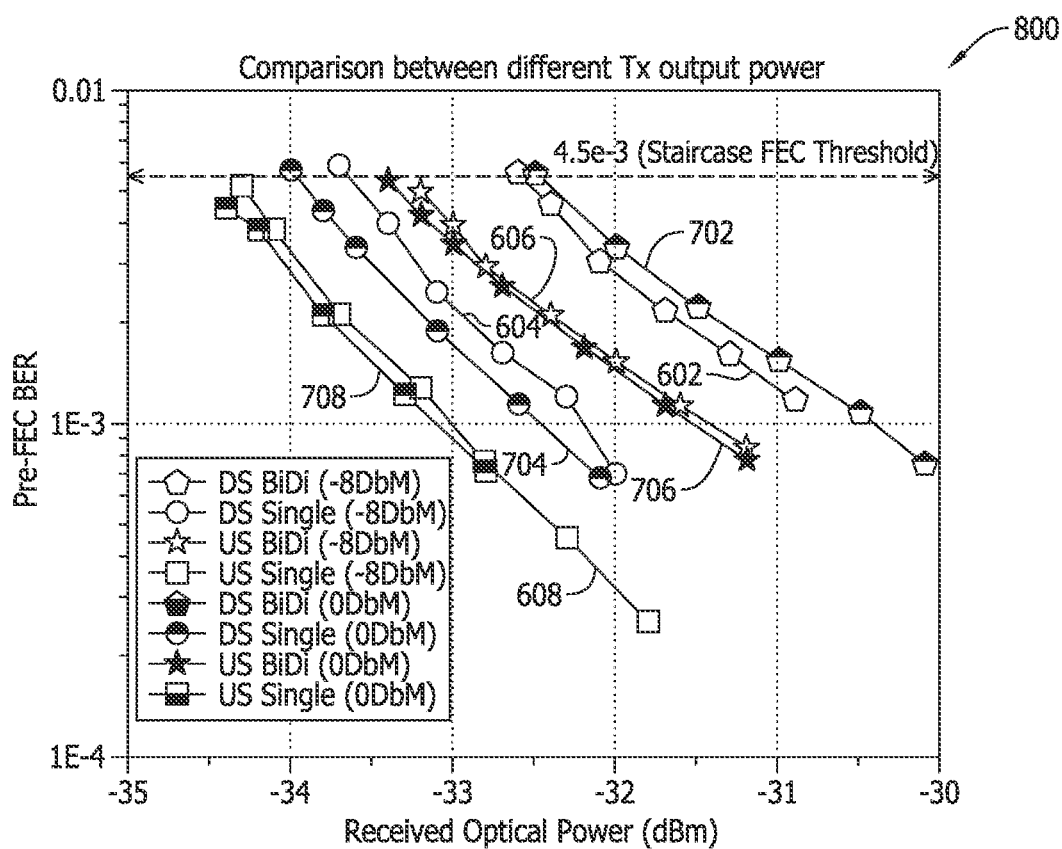
FIG. 8 is graphical illustration of a superposition of the plots depicted in FIGS. 6 and 7.

FIG. 8 is graphical illustration of a superposition 800 of plot 600, FIG. 6, and plot 700, FIG. 7. Superposition 800 illustrates how the received optical power generally tracks with the results of different transmitter output powers, and is generally higher as the transmitter output power increases, except in the bidirectional downstream transmission.

From the preliminary results of the embodiments described immediately above, additional analysis of testing results were obtained several implementations of full duplex coherent optics architectures and systems. Conventional full duplex coherent optics systems are subject to significant impairments, including: (i) Stimulated Brillouin Scattering (SBS); (ii) Rayleigh scattering (continuous reflection); (iii) Multiple-Path/Multipath Interference (MPI), for coherent or incoherent interference, and including double-Rayleigh scattering, local reflections (mechanical splices, fusion, jumper cables, etc.), and/or optical amplifiers; and (iv) Fresnel reflection (discrete reflections), including jumper cables, optical distribution panels, fusion, mechanical splices, etc.

Figure 9:
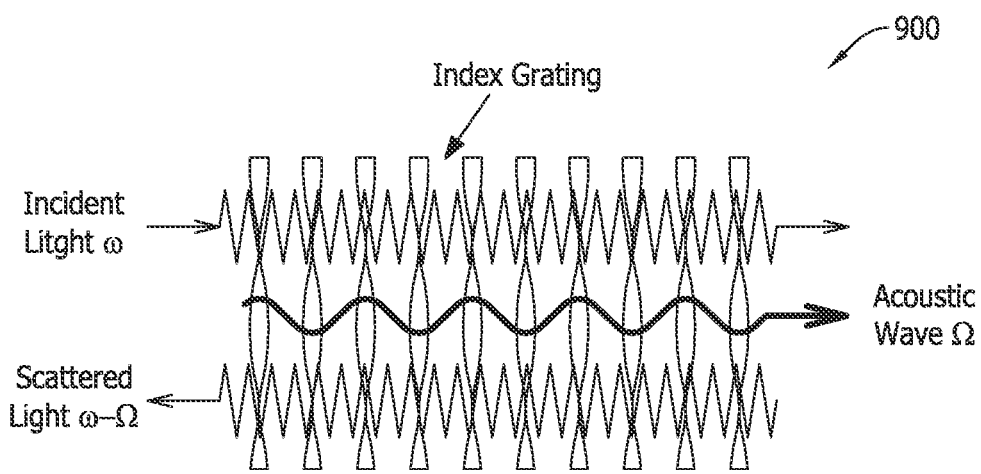
FIG. 9 depicts a stimulated Brillouin scattering effect.

FIG. 9 depicts a SBS effect 900. SBS effect 900 occurs, for example, where variations in the electric field of an incident beam of light (e.g., from a laser) traveling through a transport medium (e.g., an optical fiber), induce acoustic vibrations (i.e., an acoustic wave) in the fiber by electrostriction or radiation pressure. Brillouin scattering (e.g., scattered light) thus occurs, in the direction opposite the incident light beam as a result of the acoustic wave vibrations, as illustrated in FIG. 9. More particularly, SBS effect 900 occurs from the interaction between the light and acoustic waves. The propagating light beam in the fiber generates a propagating acoustic wave that creates a periodic variation of the fiber refractive index. The back-scattered wave, also referred to as a Stokes wave, is downshifted by approximately 11 GHz with respect to the incident light wave frequency. When increasing the launched power of the optical beam, the reflected power will increase linearly as a result of the Rayleigh back-scattering effect in the fiber. Above a given threshold, the reflected power will then increase exponentially due to SBS effect 900.

Figure 10:
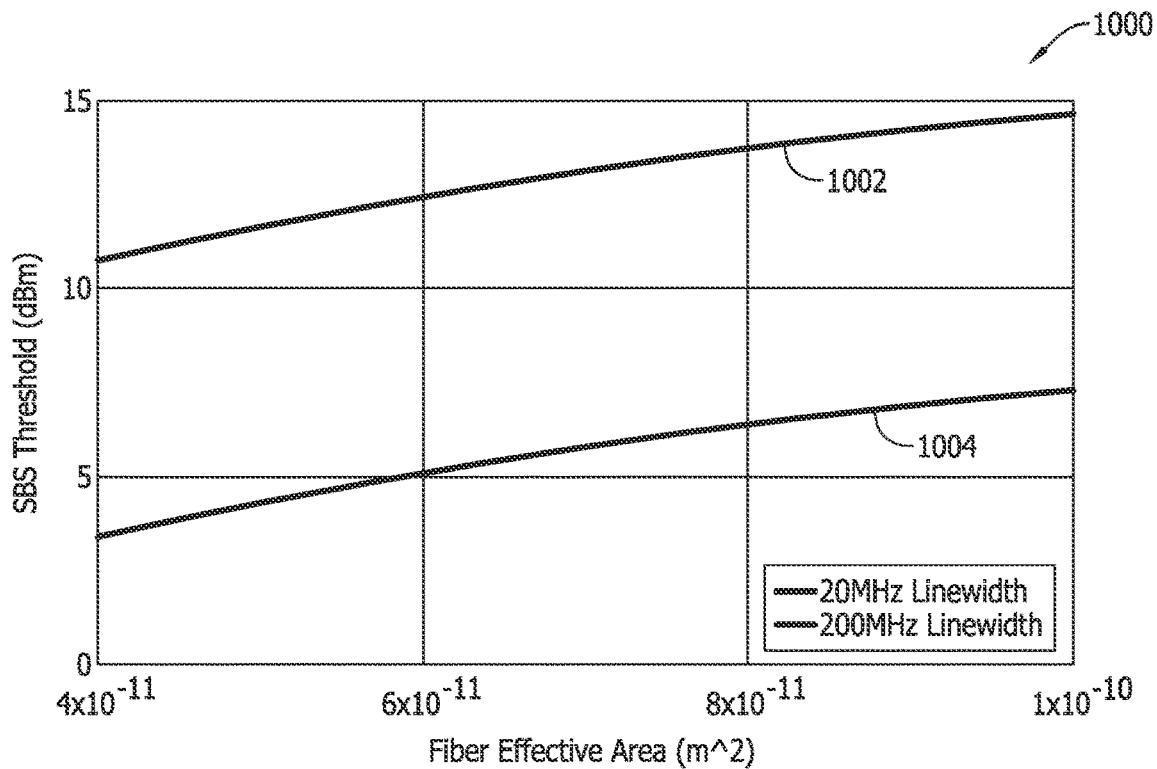
FIG. 10 is graphical illustration of a comparative plot of stimulated Brillouin scattering threshold against fiber effective area.

FIG. 10 is graphical illustration of a comparative plot 1000 of SBS threshold against fiber effective area. Comparative plot 1000 includes a first sub-plot 1002 representing a case of a 200 MHz linewidth, and a second sub-plot 1004 representing a case of a 20 MHz linewidth. As can be seen from the example depicted in FIG. 10, the SBS threshold is considerably greater as the linewidth increases.

In an exemplary embodiment, SBS threshold (Power_th) for an unmodulated continuous wave (CW) may be represented as:

$$\text{Power\_th}(B, g_b, \alpha_{dB}, A_{\mathit{eff}}, \text{Length}, \Delta v_S, \Delta v_B) := \frac{21 \cdot B \cdot A_{\mathit{eff}}}{g_b \cdot \frac{1 - e^{-\alpha_{dB} \cdot \frac{\ln(10)}{10} \cdot \text{Length}}}{\alpha_{dB} \cdot \frac{\ln(10)}{10}}} \cdot \left(1 + \frac{\Delta v_S}{\Delta v_B}\right)$$

Where B is a number between 1 and 2 of a polarization state, $A_{\mathit{eff}}$ is the effective area of fiber, $g_b$ is an SBS gain coefficient, Length is the fiber distance, $\alpha_{dB}$ is a fiber attenuation coefficient, $\Delta v_S$ is a linewidth of signal source, and $\Delta v_B$ is an SBS interaction bandwidth. In the example depicted in FIG. 10, the SBS threshold for the unmodulated CW was Power_th(1, 4*10$^{-11}$, 0.0002, $A_{\mathit{eff}}$, 50*10$^3$, 20*10$^6$, 20*10$^6$).

Figure 11:
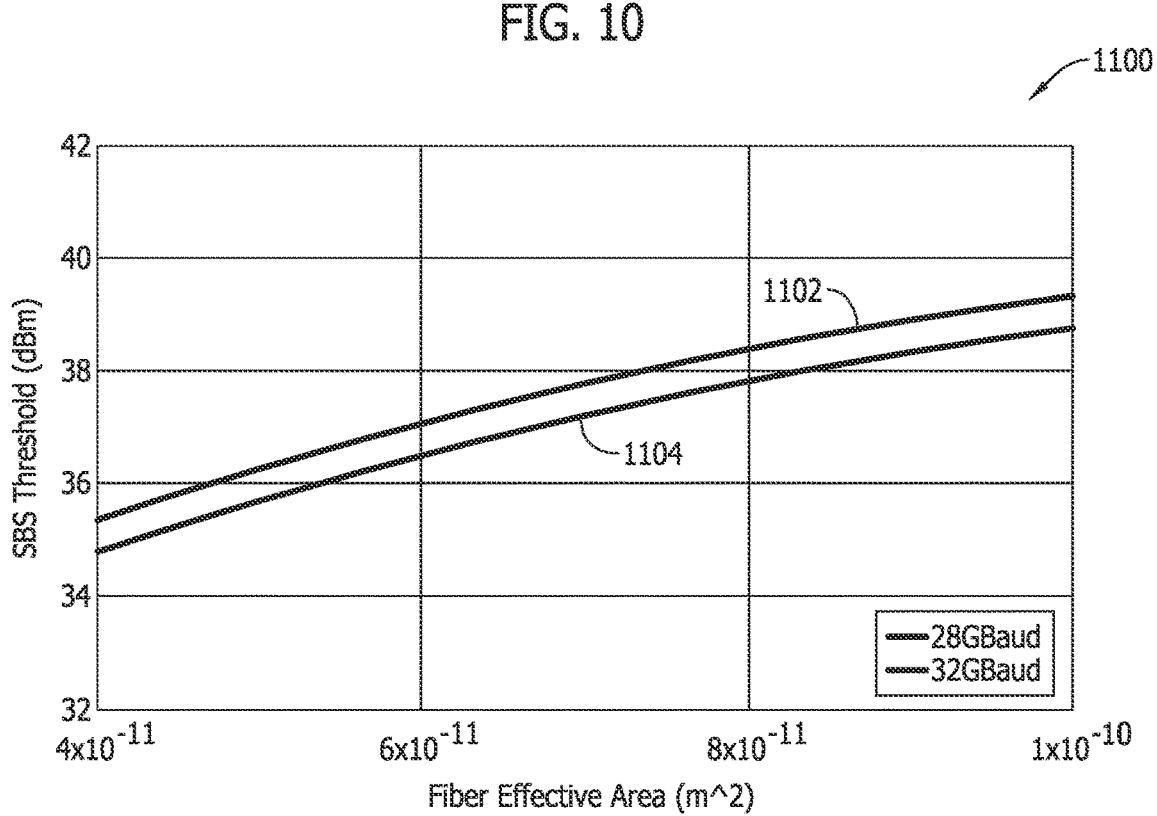
FIG. 11 is graphical illustration of a comparative plot of stimulated Brillouin scattering threshold against fiber effective area.

FIG. 11 is graphical illustration of a comparative plot 1100 of SBS threshold against fiber effective area. Comparative plot 1100 is similar to comparative plot 1000, FIG. 10, except that comparative plot 1100 depicts a comparison of different baud levels, as opposed to different linewidths. More specifically, comparative 1100 includes a first sub-plot 1102 representing a 32 GBaud case, and a second sub-plot 1004 representing a 28 GBaud case. As can be seen from comparative plot 1100, the SBS threshold is greater as the baud increases. In the example depicted in FIG. 11, the experimental results were gathered using PM-QPSK signals over a 50-km (19.54-km effective length) transmission, the SBS threshold for the PM-QPSK signals was Power_th(1, 4*10-11, 0.0002, $A_{\mathit{eff}}$, 50*10$^3$, 28*10$^9$, 20*10$^6$).

Figure 12:
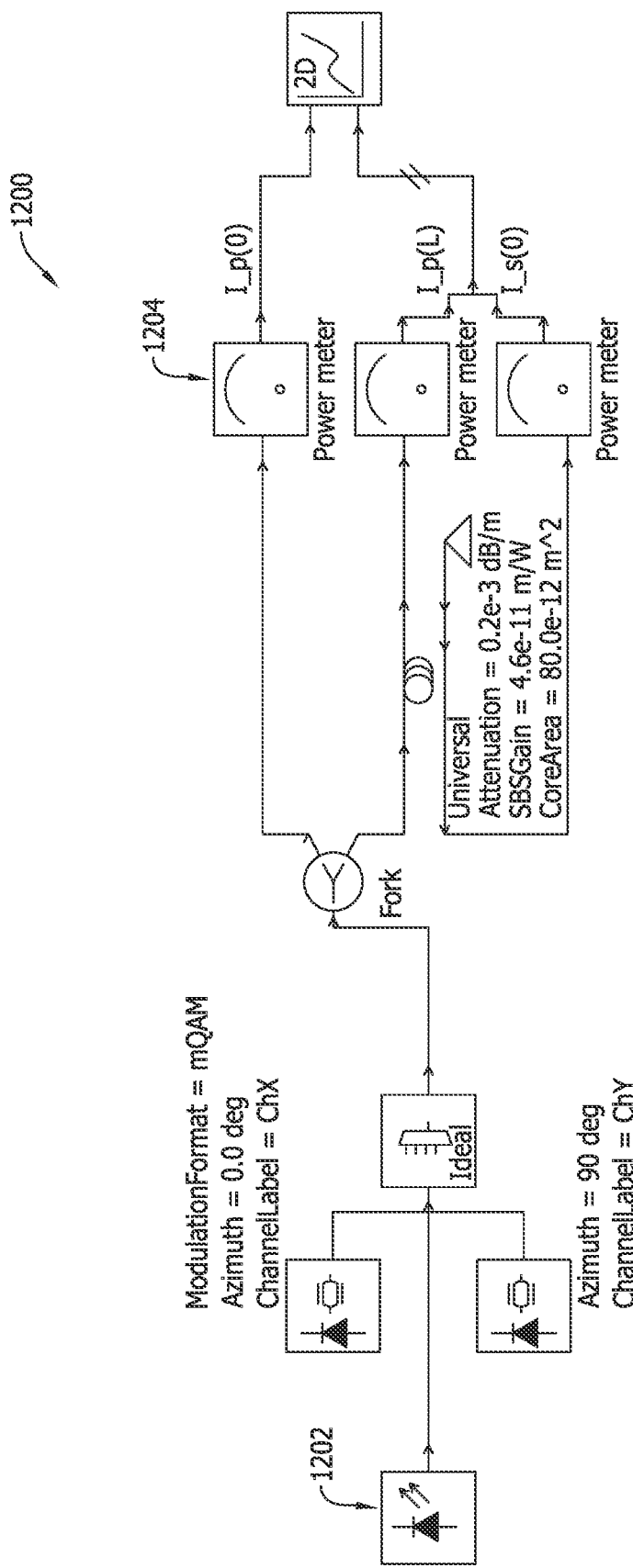
FIG. 12 is a schematic illustration of a coherent optics network test system.

FIG. 12 is a schematic illustration of a coherent optics network test system 1200. Test system 1200 was used to obtain, from an input power source 1202, measured power results 1204, as described further below with respect to FIGS. 13 and 14, for a CW source (e.g., comparative plot 1000, FIG. 10) and a QPSK source (e.g., comparative plot 1100, FIG. 11), respectively.

Figure 13:
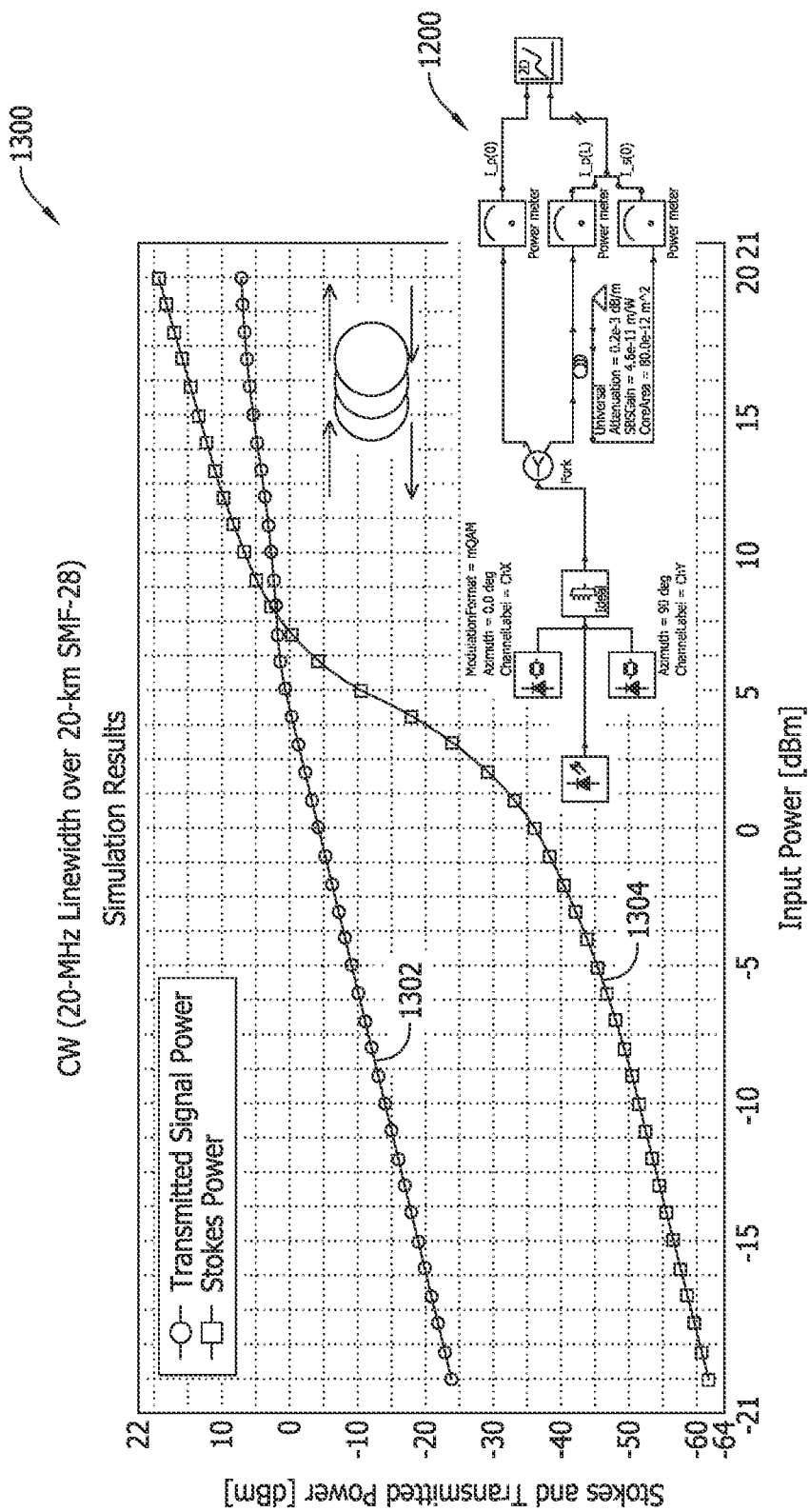
FIG. 13 is graphical illustration of a comparative plot of measured power against input power utilizing the test system depicted in FIG. 12.

FIG. 13 is graphical illustration of a comparative plot 1300 of measured power against input power utilizing test system 1200, FIG. 12, in a simulation. In an exemplary embodiment, the input power is representative of a CW source, and the measured power is for a 20 MHz linewidth over a 20-km SMF-28. In this example, the measured power of comparative plot 1300 includes a first sub-plot 1302 representing the transmitted signal power, and a second sub-plot 1304 representing the Stokes power. As can be seen from the example depicted in FIG. 13, the measured transmitted signal power 1302 is significantly greater than the Stokes power 1304 until the input power reaches approximately 7 dBm, above which the measured Stokes power 1304 exceeds the measured transmitted signal power.

Figure 14:
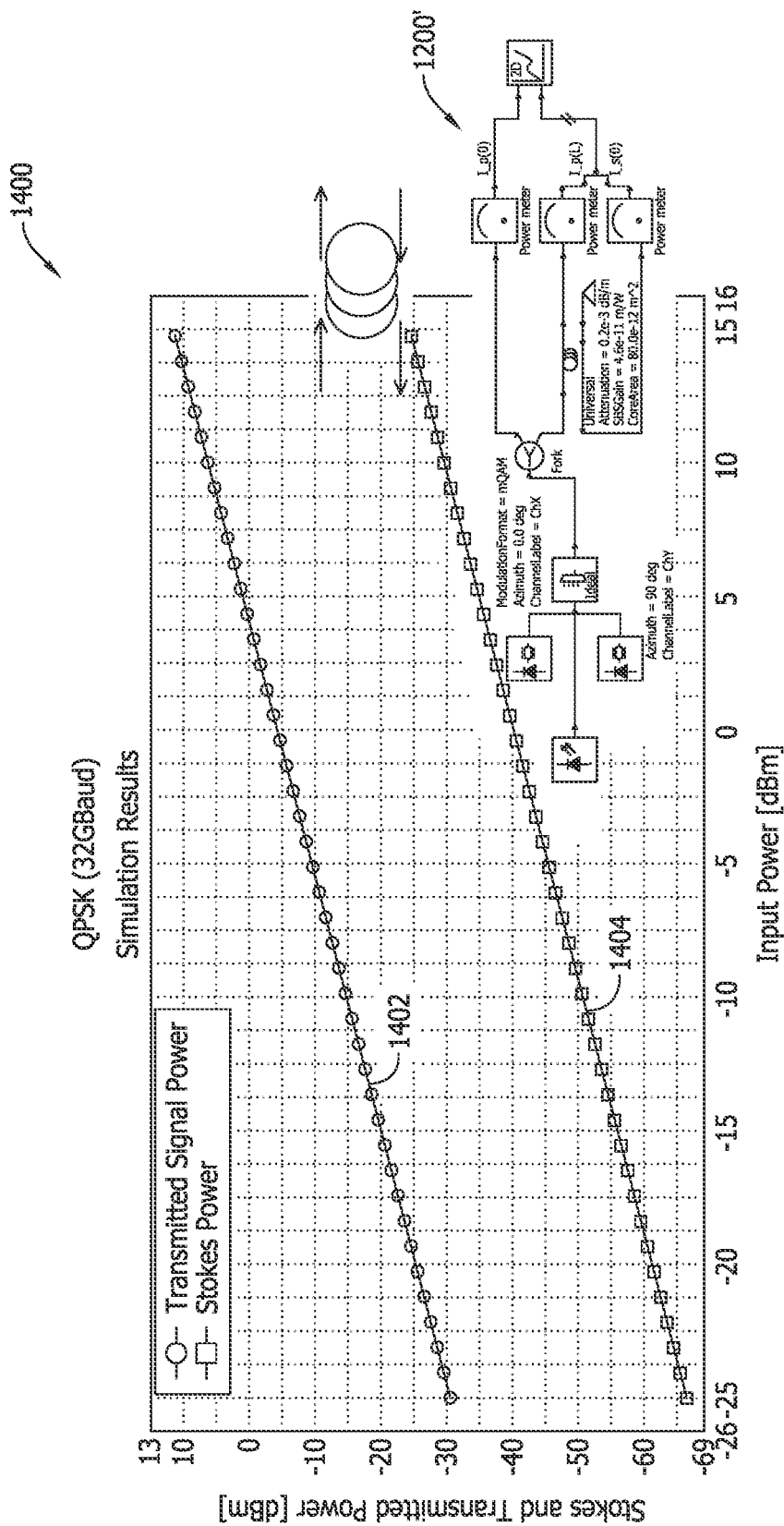
FIG. 14 is graphical illustration of an alternative comparative plot of measured power against input power.

FIG. 14 is graphical illustration of an alternative comparative plot 1400 of measured power against input power. Comparative plot 1400 is similar to comparative plot 1300, FIG. 13, except that comparative plot 1400 demonstrates the result of the simulation for a QPSK (32 GBaud) source utilizing test system 1200, FIG. 12, in alternative simulation. In this example, the measured power of comparative plot 1400 includes a first sub-plot 1402 representing the transmitted signal power, and a second sub-plot 1404 representing the Stokes power. As can be seen from the example depicted in FIG. 14, the measured transmitted signal power 1402 is consistently greater than the Stokes power 1404 across the entire range of input power levels.

Accordingly, in the case of SBS in coherent optic systems, because of the effect of phase-modulated signals on the reduction of optical carrier power, the effective linewidth is proportional to the signal baud rate. Accordingly, the SBS threshold power will significantly increase in a similar manner. However, the SBS was found to be negligible for a launch power less than 7 dBm/channel in the coherent optical systems described above with respect to FIG. 13 (CW source).

Simulations in consideration of Rayleigh scattering impairments are described further below with respect to FIGS. 15-17.

Figure 15:
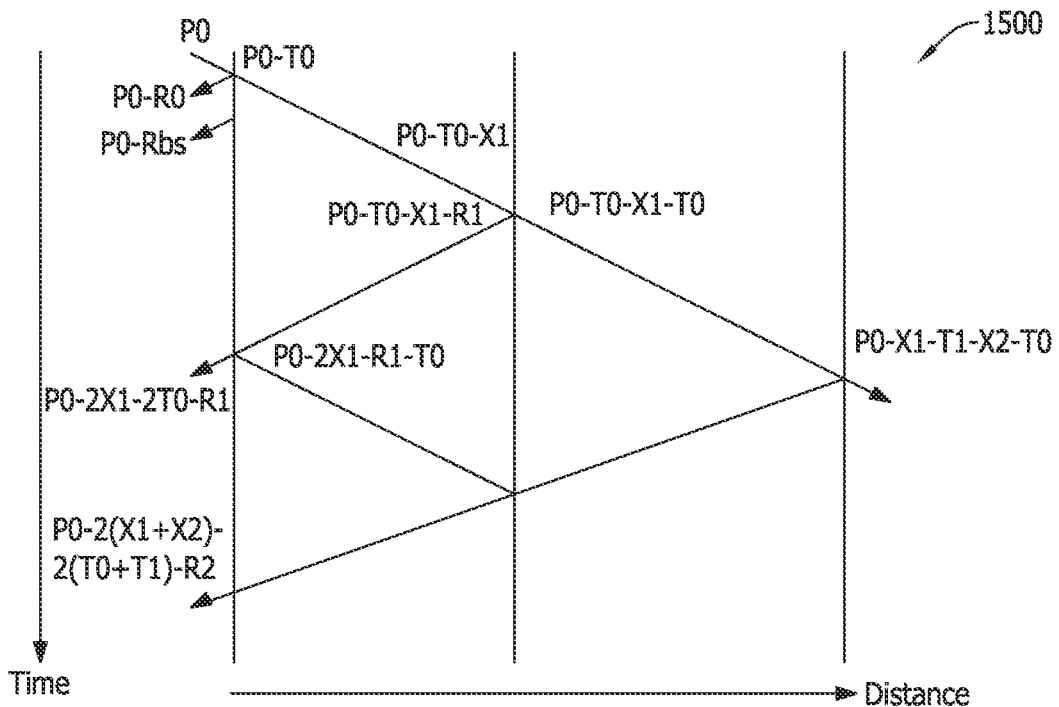
FIG. 15 is a zigzag reflection diagram of Rayleigh scattering.
Figure 16:
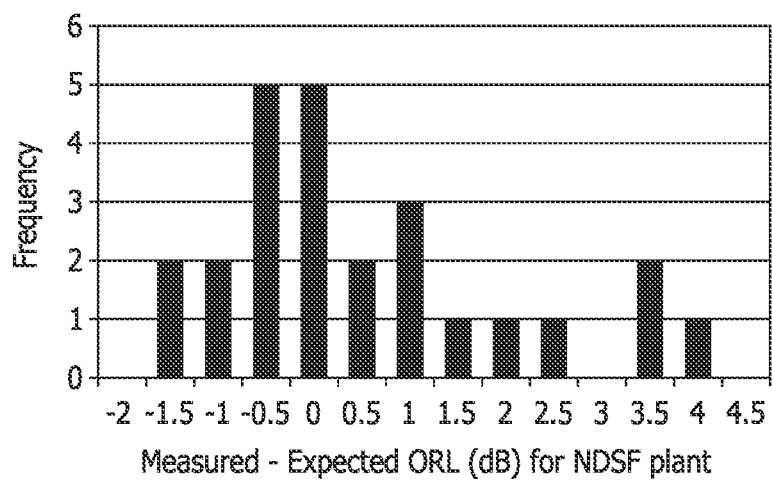
FIG. 16 is a graphical illustration depicting a histogram of frequency over optical return loss for a single mode fiber.

FIG. 15 is a zigzag reflection diagram 1500 of Rayleigh scattering. Reflection diagram 1500 demonstrates the significant of time and distance with respect to the scattering effect. FIG. 16 is a graphical illustration depicting a histogram 1600 of frequency against optical return loss (ORL) for an SMF-28. The example depicted in FIG. 16 illustrates a case of a non-dispersion-shifted fiber (NDSF) SMF-28.

Figure 17:
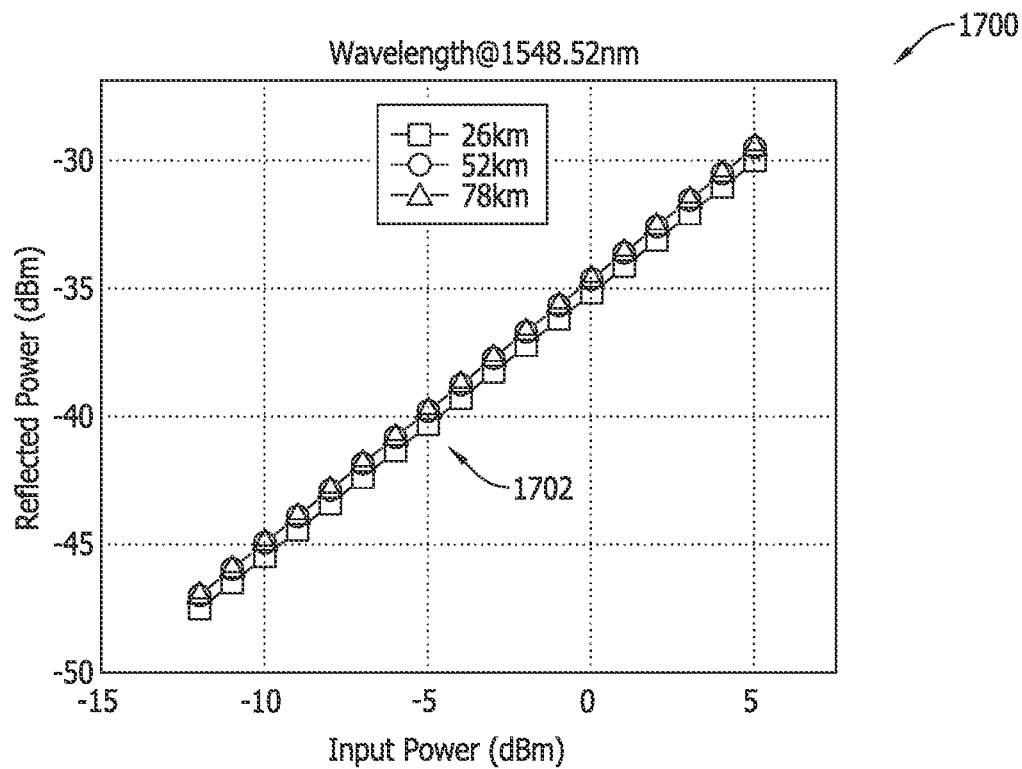
FIG. 17 is a graphical illustration depicting a comparative plot of reflected power against input power.

FIG. 17 is a graphical illustration depicting a comparative plot 1700 of reflected power against input power. Comparative plot 1700 depicts simulated results at a 1548.52 nm wavelength, and includes sub-plots 1702 representative of a 35 dB reflection power measured over different transmission distances of 26-km, 52-km, and 78-km, respectively. As can be seen from the example depicted in FIG. 17, the reflected power tracks fairly linearly with the input power, and is substantially agnostic of the various changes to the transmission distances.

Figure 18:
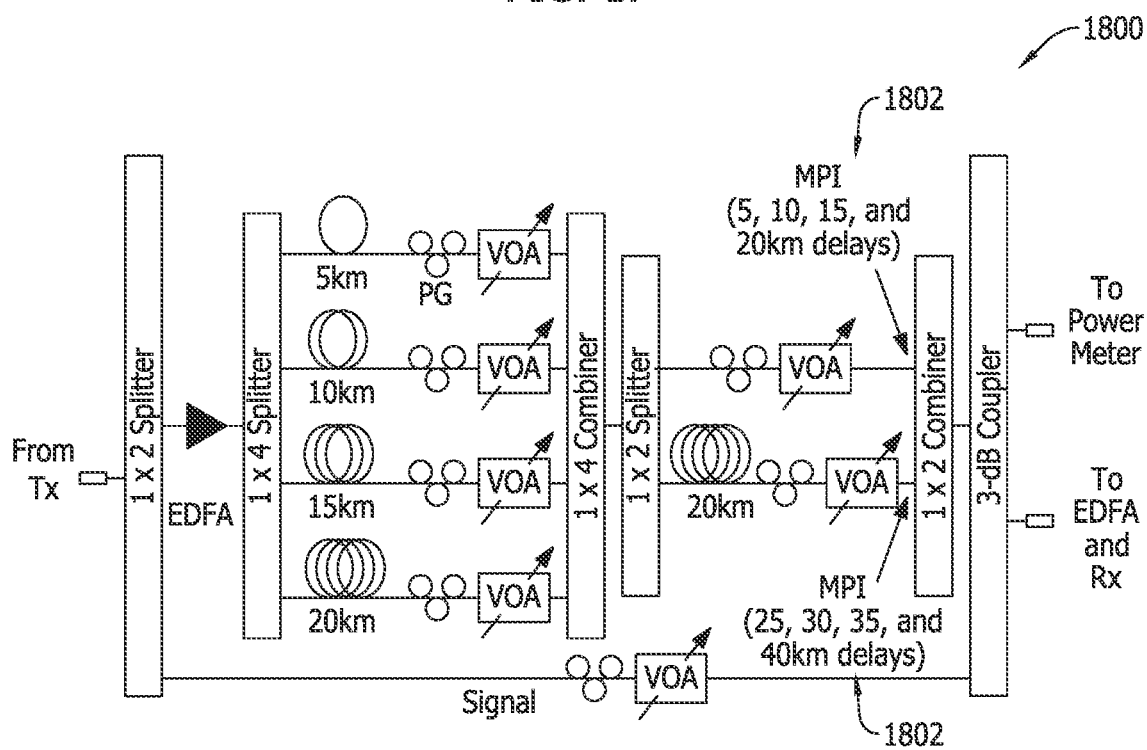
FIG. 18 is a schematic illustration of a multipath interference source system.

FIG. 18 is a schematic illustration of an MPI source system 1800. In the embodiment depicted in FIG. 18, system 1800 is utilized to produce MPI interference 1802 over eight separate paths (i.e., 5-km, 10-km, 15-km, 20-km, 25-km, 30-km, 35-km, and 40-km delays, in this example). In an exemplary embodiment, system 1800 implements a plurality of variable optical attenuators (VOAs).

Figure 19:
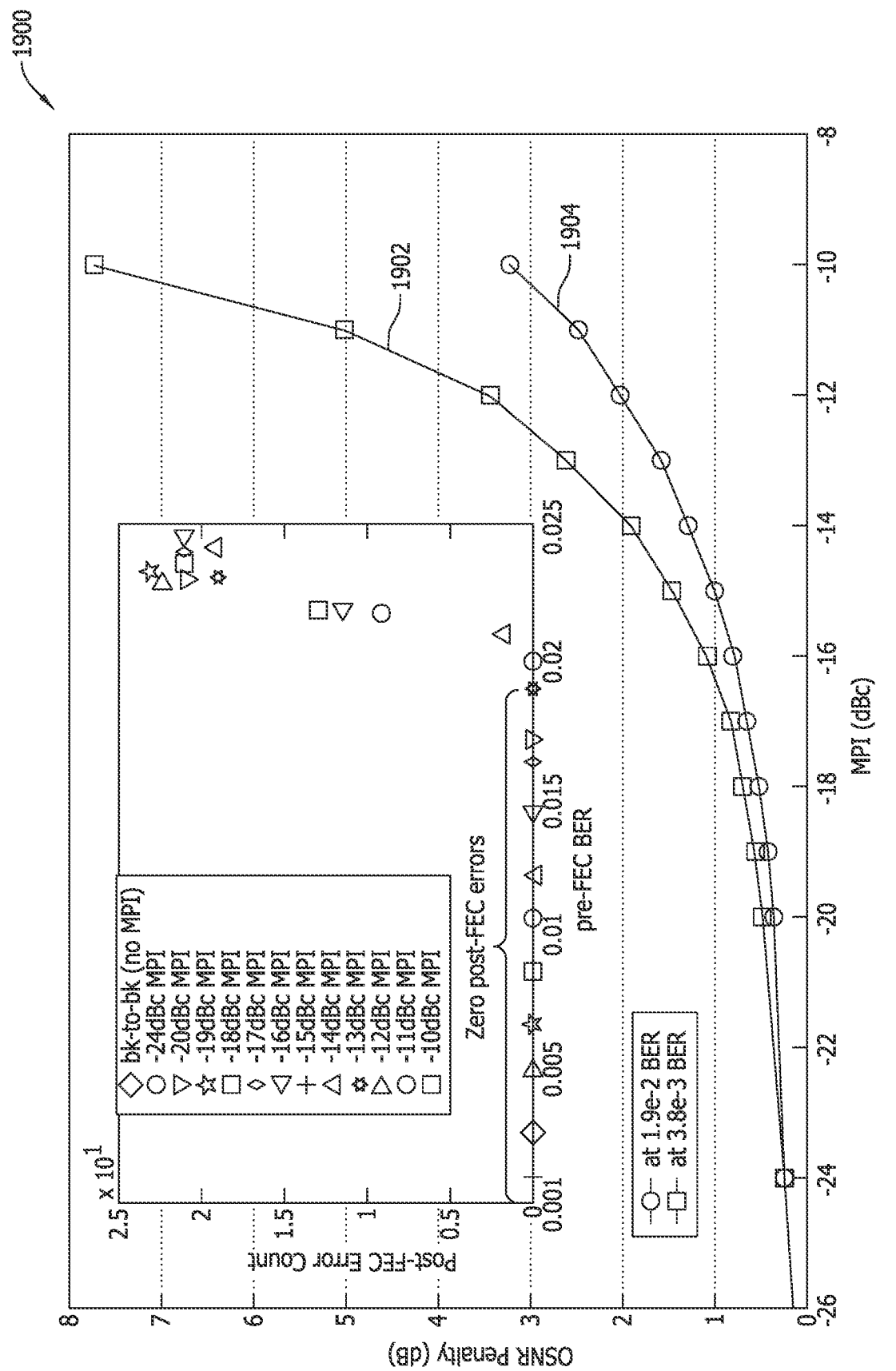
FIG. 19 is graphical illustration depicting a comparative plot of optical signal-to-noise ratio penalty as a function of multipath interference.

FIG. 19 is graphical illustration depicting a comparative plot 1900 of optical signal-to-noise ratio (OSNR) penalty as a function of MPI (e.g., FIG. 18). In this example, comparative plot 1900 includes a first sub-plot 1902 representative of a 3.8e-3 BER, and a second sub-plot 1904 representative of a 1.9e-3 BER. As can be seen from the example depicted in FIG. 19, the OSNR penalty increases exponentially as a function of MPI, and that this effect is significantly greater as the BER increases. Nevertheless, sub-plot 1902 demonstrates that, at 3.8e-3 BER, approximately 1 dB of OSNR penalty can be observed for −16 dBc of MPI, which indicates a significantly high tolerance to MPI. In the example depicted in FIG. 19, the results were obtained in consideration of the post-FEC error count against the pre-FEC BER, which included a substantial range having zero post-FEC errors.

Figure 20:
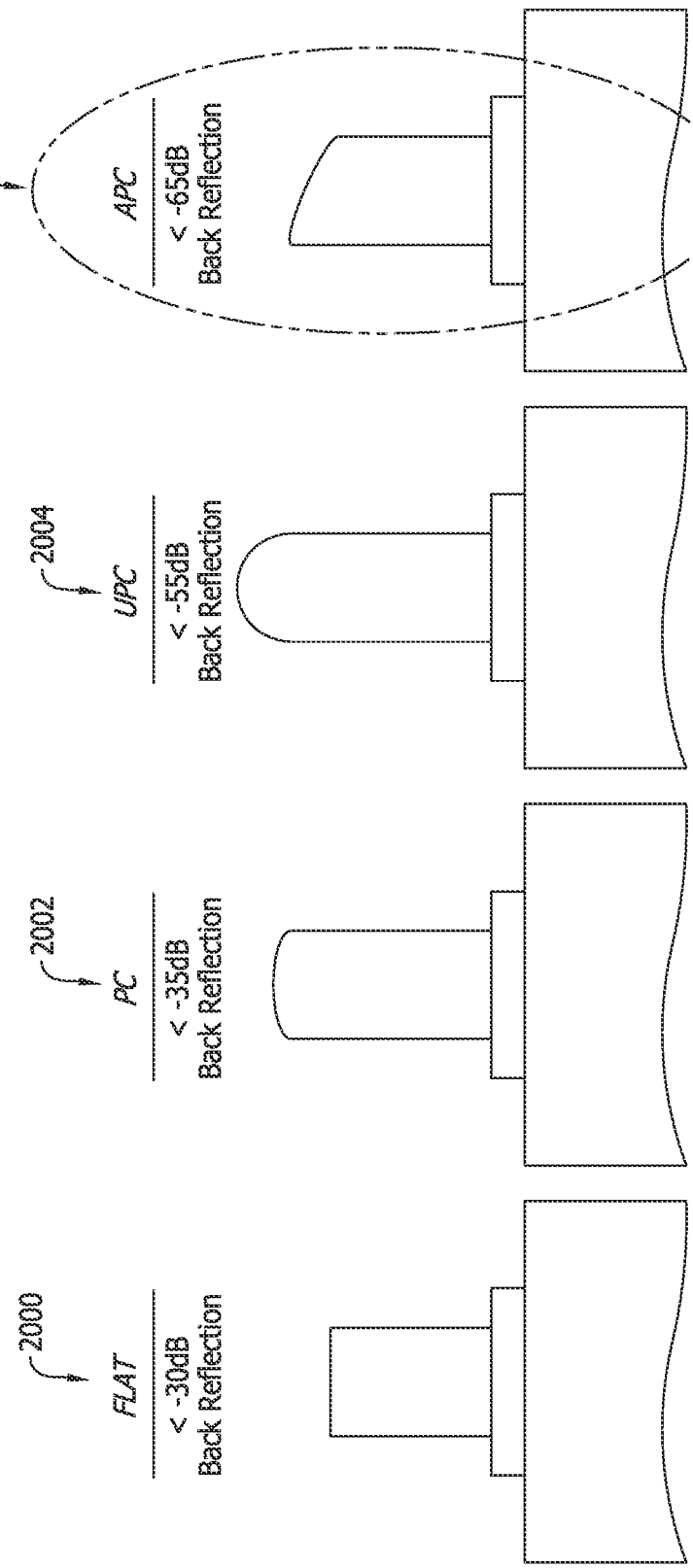
FIG. 20 depicts alternative fiber connector structures.

FIG. 20 depicts alternative fiber connector structures 2000, 2002, 2004, 2006 having different respective ferrule end finishes to reduce reflectance/loss. More specifically, structure 2000 represents a flat fiber optic end finish (e.g., less than −30 dB back reflection), structure 2002 represents a physical contact (PC) fiber optic end finish (e.g., less than −35 dB back reflection), structure 2004 represents an ultra physical contact (UPC) fiber optic end finish (e.g., less than −55 dB back reflection), and structure 2006 represents an angled physical contact (APC) optical end finish (e.g., less than −65 dB back reflection). APC structure 2006 is often found in existing hybrid fiber coaxial (HFC) networks, whereas UPC structure 2004 is often considered for networks having a relatively small number of digital links.

The following embodiments describe additional systems and methods for experimental analysis and lab testing for further proof of concept from the experimental results obtained thereby. More particularly, the embodiments depicted in FIGS. 21-27 generally correspond with the several hub-to-fiber node architectures depicted in FIGS. 1-5, described above, but are addressed more generally to the full duplex paradigm of bidirectionality, which may be more significantly agnostic of which direction is considered "downstream" versus "upstream."

Figure 21:
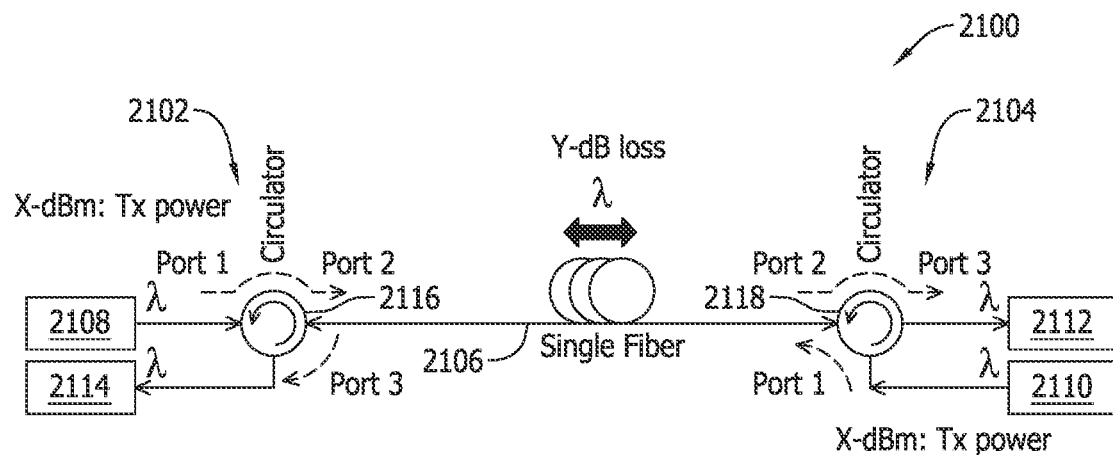
FIG. 21 is a schematic illustration of a coherent optics network architecture.

FIG. 21 is a schematic illustration of a coherent optics network architecture 2100. In an exemplary embodiment, architecture 2100 includes a first coherent transceiver 2102 in operable communication with a second coherent transceiver 2104 over an SMF 2106. First coherent transceiver 2102 includes a first transmitter portion 2108 and second coherent transceiver 2104 includes a second transmitter portion 2110. Similarly, second coherent transceiver 2104 includes a first receiver portion 2112, and first coherent transceiver 2102 includes a second receiver portion 2114. First transmitter portion 2110 and second receiver portion 2114 communicate with fiber 2106 through a first optical circulator 2116, and first receiver portion 2112 and second transmitter portion 2110 communicate with fiber 2106 through a second optical circulator 2118.

In exemplary operation of architecture 2100, first and second transmitter portions 2108, 2110 both transmit at X-dBm of transmit power, and fiber 2106 is subject to Y-dB loss. Accordingly, architecture 2100 should function such that values for X−Y≥−30 dBm (e.g., the receiver sensitivity), and that values for [(X−Y)−(X−35)]≥15.4 dB (e.g., the OSNR, however, larger OSNR values are contemplated due to only 0.1 nm noise power included in this example). Further to this example, the loss Y should be such that Y(loss)≤19.6 dB.

Figure 22:
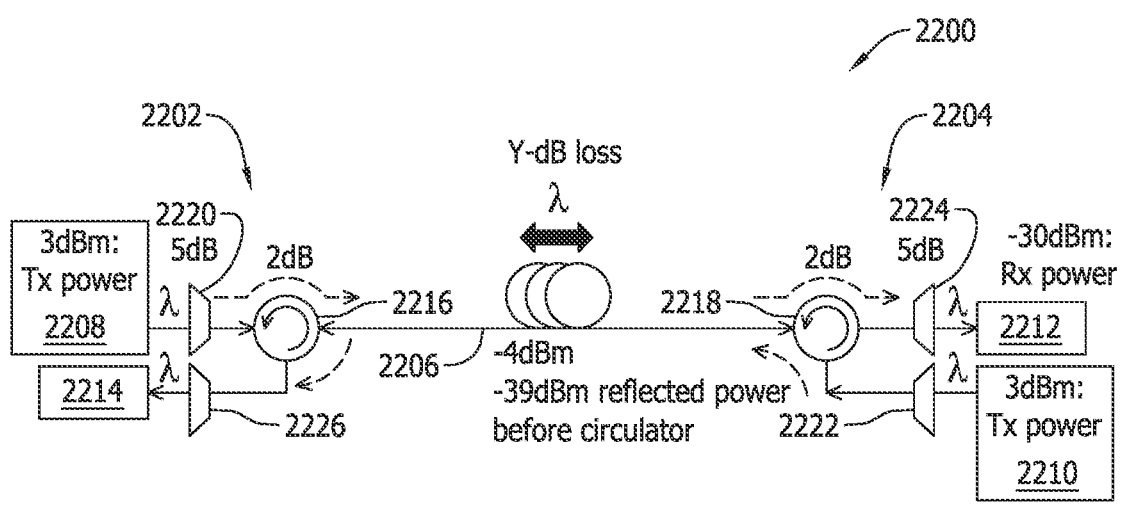
FIG. 22 is a schematic illustration of a coherent optics network architecture.

FIG. 22 is a schematic illustration of a coherent optics network architecture 2200. Architecture 2200 is similar to architecture 2100, FIG. 21, and similarly includes a first coherent transceiver 2202, a second coherent transceiver 2204, an SMF 2206, a first transmitter portion 2208, a second transmitter portion 2210, a first receiver portion 2212, a second receiver portion 2214, a first optical circulator 2216, and a second optical circulator 2218. Architecture 2200 differs from architecture 2100 though, in that architecture 2200 further includes a first optical multiplexer 2220 at first transceiver 2202 and a second optical multiplexer 2222 at second transceiver 2204, and also a first optical demultiplexer 2224 at second transceiver 2204 and a second optical demultiplexer 2226 at first transceiver 2202. This dual-multiplexer/demultiplexer configuration operates similarly to architecture 300, FIG. 3.

In the example depicted in FIG. 22, first and second transmitter portions 2208, 2210 operate at 3 (e.g., X) dBm of transmit power, and the sensitivity of first receiver portion 2212 is −30 dBm received power. According to the calculations described above, the total loss Y will be (X—receiver sensitivity), which is [3−(−30)], or 33 dB. Further in this example, loss at each optical circulator 2216, 2218 is 2 dB, and loss at the multiplexers/demultiplexers is 5 dB each. Accordingly, the fiber loss may then be calculated as [33−(5+2)*2], or 19 dB. The reflected power before second optical circulator 2218 is [−33−(5+2)], or −39 dB, and the reflected power at receiver portion 2212 will be [−39−(2+5)], or −46 dBm. From these values, the OSNR is found from [−30−(−46)], or 16 dB.

Figure 23:
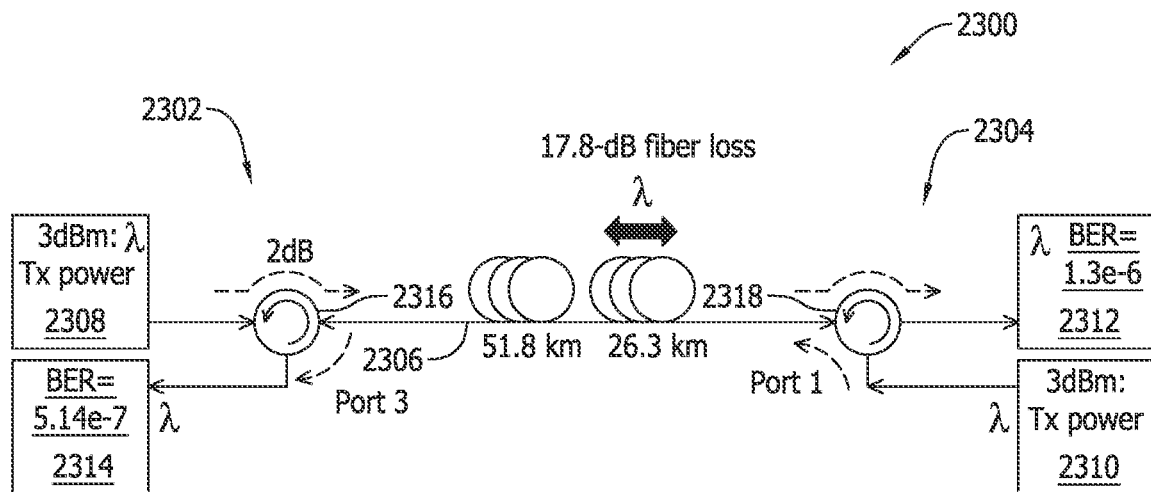
FIG. 23 is a schematic illustration of a coherent optics network architecture.

FIG. 23 is a schematic illustration of a coherent optics network architecture 2300. Architecture 2300 is also similar to architecture 2100, FIG. 21, and similarly includes a first coherent transceiver 2302, a second coherent transceiver 2304, an SMF 2306, a first transmitter portion 2308, a second transmitter portion 2310, a first receiver portion 2312, a second receiver portion 2314, a first optical circulator 2316, and a second optical circulator 2318, with both first and second transmitter portions 2308, 2310 operating at 3 dBm of transmit power. In the example depicted in FIG. 23 fiber 2306 includes a 51.8-km portion and a 26.3-km portion, and exhibits a 17.8 dB fiber loss (i.e., approximately 18 dB total common link loss). Accordingly, in this embodiment, first receiver portion 2312 has a BER of 1.3e-6, and second receiver portion 2314 has a BER of 5.14e-7.

Figure 24:
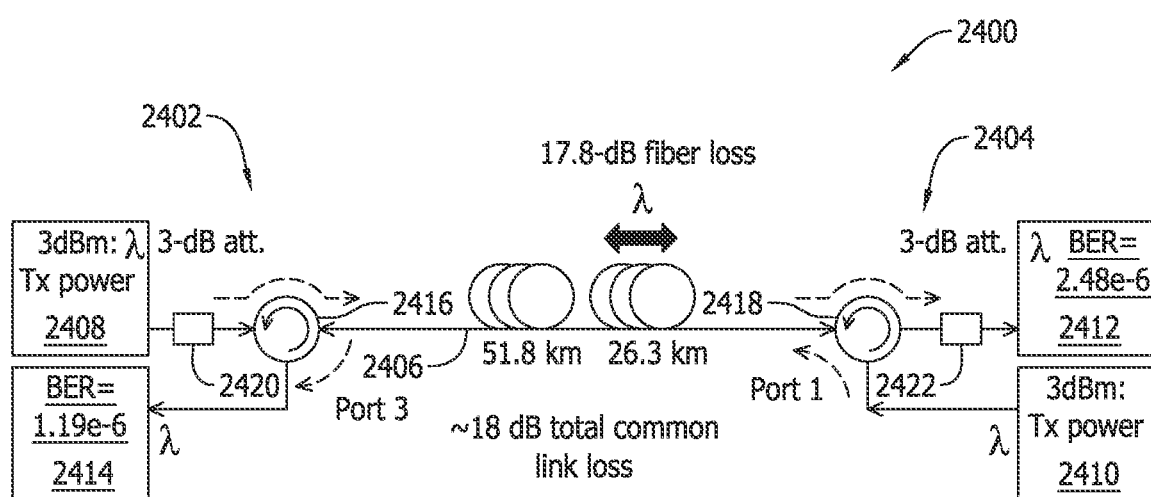
FIG. 24 is a schematic illustration of a coherent optics network architecture.

FIG. 24 is a schematic illustration of a coherent optics network architecture 2400. Architecture 2400 is also similar to architecture 2300, FIG. 23, and similarly includes a first coherent transceiver 2402, a second coherent transceiver 2404, an SMF 2406 (17.8 dB fiber loss, in this example also), a first transmitter portion 2408, a second transmitter portion 2410, a first receiver portion 2412, a second receiver portion 2414, a first optical circulator 2416, and a second optical circulator 2418, with both first and second transmitter portions 2408, 2410 operating at 3 dBm of transmit power and at approximately 18 dB total common link loss. Architecture 2400 differs from architecture 2300 though, in that architecture 2400 further includes a first attenuator 2420 between first transmitter portion 2408 and first optical circulator 2416, and a second attenuator 2422 between second optical circulator 2418 and first receiver portion 2412, with each attenuator 2420, 2422 having 3 dB of attenuation. Accordingly, in this embodiment, first receiver portion 2412 has a BER of 2.48e-6, and second receiver portion 2414 has a BER of 1.19e-6.

Figure 25:
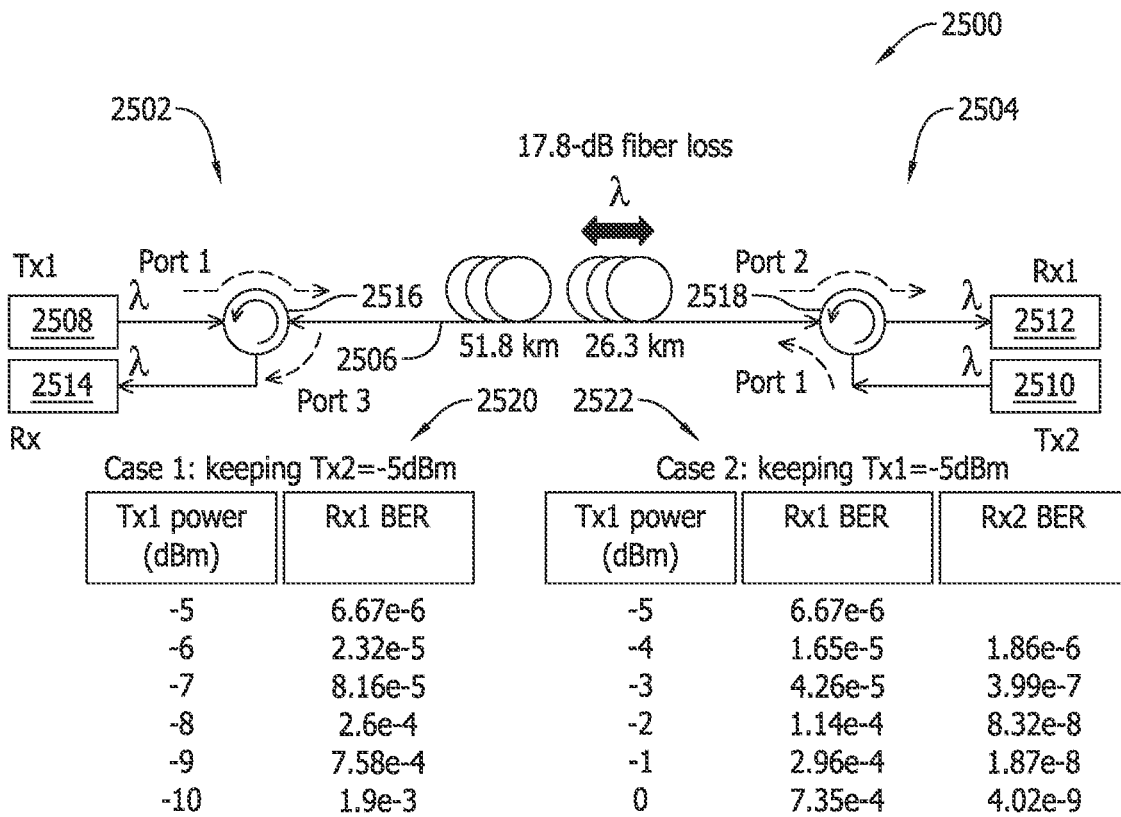
FIG. 25 is a schematic illustration of a coherent optics network architecture.

FIG. 25 is a schematic illustration of a coherent optics network architecture 2500. Architecture 2500 is also similar to architecture 2300, FIG. 23, and and similarly includes a first coherent transceiver 2502, a second coherent transceiver 2504, an SMF 2506 (17.8 dB fiber loss, in this example also), a first transmitter portion 2508, a second transmitter portion 2510, a first receiver portion 2512, a second receiver portion 2514, a first optical circulator 2516, and a second optical circulator 2518. Different from architecture 2400 though, in the example depicted in FIG. 25, first and second transmitter portions 2508, 2510 are configured to operate at various transmit power levels.

More particularly, architecture 2500 operates according to a first case, where the transmit power of first transmitting portion 2508 varies from −5 dBm through −10 dBm, while the transmit power of second transmitting portion 2510 remains constant at −5 dBm. Accordingly, the BER values at first receiver portion 2512 correspondingly change, as reflected in table 2520. Similarly, architecture 2500 operates according to a second case, where the transmit power of second transmitting portion 2510 varies from 0 dBm through −5 dBm, while the transmit power of first transmitting portion 2508 remains constant at −5 dBm. Accordingly, the BER values at second receiver portion 2514 correspondingly change, as reflected in table 2522.

Figure 26:
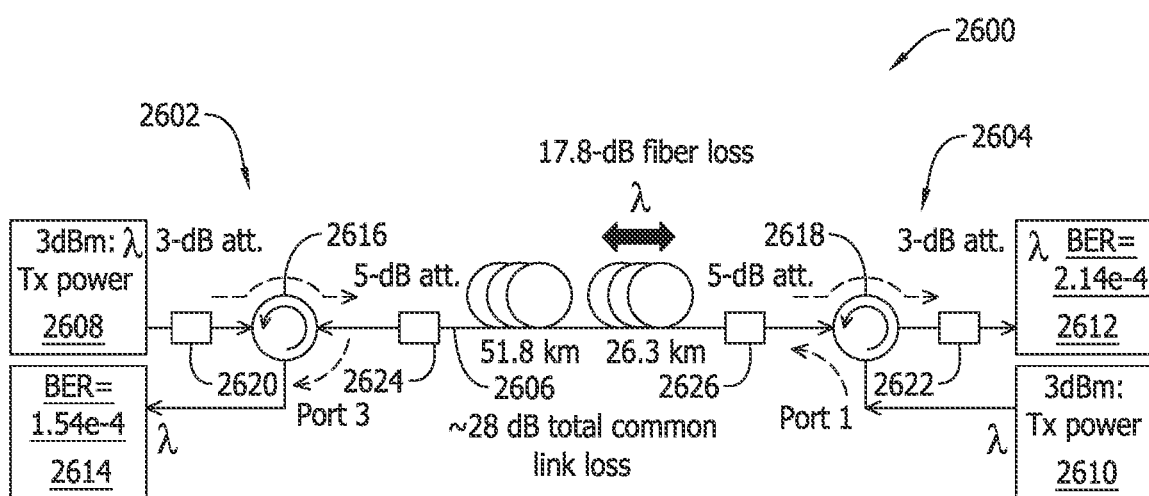
FIG. 26 is a schematic illustration of a coherent optics network architecture.

FIG. 26 is a schematic illustration of a coherent optics network architecture 2600. Architecture 2600 is similar to architecture 2400, FIG. 24, and similarly includes a first coherent transceiver 2602, a second coherent transceiver 2604, an SMF 2606 (17.8 dB fiber loss, in this example also), a first transmitter portion 2608, a second transmitter portion 2610, a first receiver portion 2612, a second receiver portion 2614, a first optical circulator 2616, a second optical circulator 2618, a first attenuator 2620 (3 dB), and a second attenuator 2622 (3 dB), with both first and second transmitter portions 2608, 2610 operating at 3 dBm of transmit power. Architecture 2600 differs from architecture 2400 though, in that architecture 2600 further includes, between first and second optical circulators 2416, 2418, third and fourth attenuators 2624, 2422, each having 5 dB of attenuation, thereby resulting in approximately 28 dB of total common link loss (i.e., 18 dB+(5 dB)*2), and a BER of 2.14e-4 at first receiver portion 2612 and a BER of 1.549e-4 at second receiver portion 2614.

Figure 27:
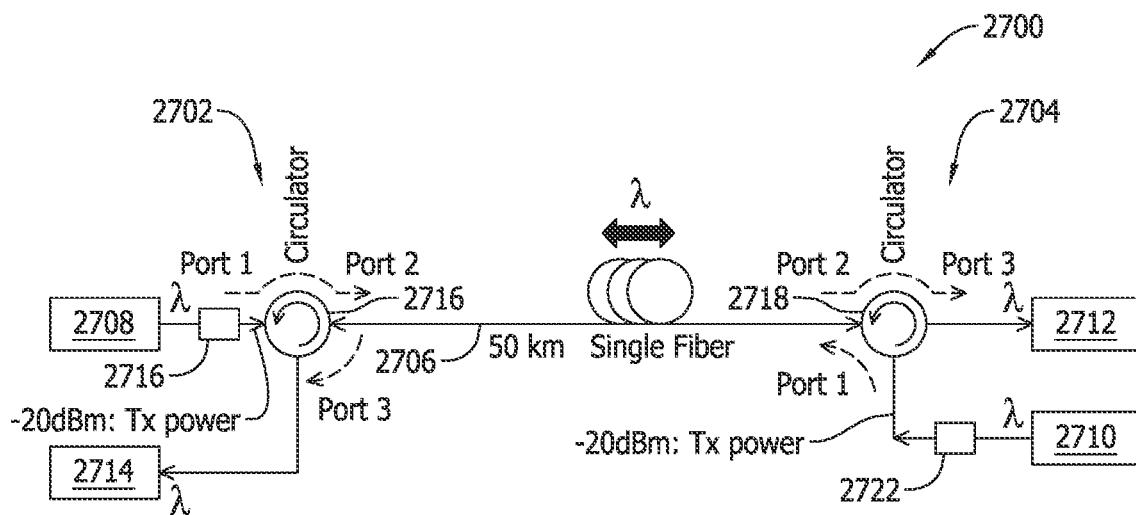
FIG. 27 is a schematic illustration of a coherent optics network architecture.

FIG. 27 is a schematic illustration of a coherent optics network architecture 2700. Architecture 2700 is also similar to architecture 2400, FIG. 24, and similarly includes a first coherent transceiver 2702, a second coherent transceiver 2704, an SMF 2706 (50-km single fiber, in this example), a first transmitter portion 2708, a second transmitter portion 2710, a first receiver portion 2712, a second receiver portion 2714, a first optical circulator 2716, a second optical circulator 2718, and a first attenuator 2720 between first transmitter portion 2708 and first optical circulator 2716. Architecture 2700 differs from architecture 2400 though, in that architecture 2700 further includes a second attenuator 2722 between second optical circulator 2718 and second transmitter portion 2710. Accordingly, in this example, each attenuator 2720, 2722 results in −20 dBm transmit power seen at the respective optical circulator.

The architectural embodiments described above are depicted with respect to single channel operation, for ease of explanation. In an exemplary spectrum plot of single channel operation is described further below with respect to FIG. 28. The person of ordinary skill in the art, however, will understand how the present systems and methods may be applied with respect to WDM operations as well. Some exemplary results of WDM operation, in accordance with the present embodiments, are described further below with respect to FIGS. 29-35.

Figure 28:
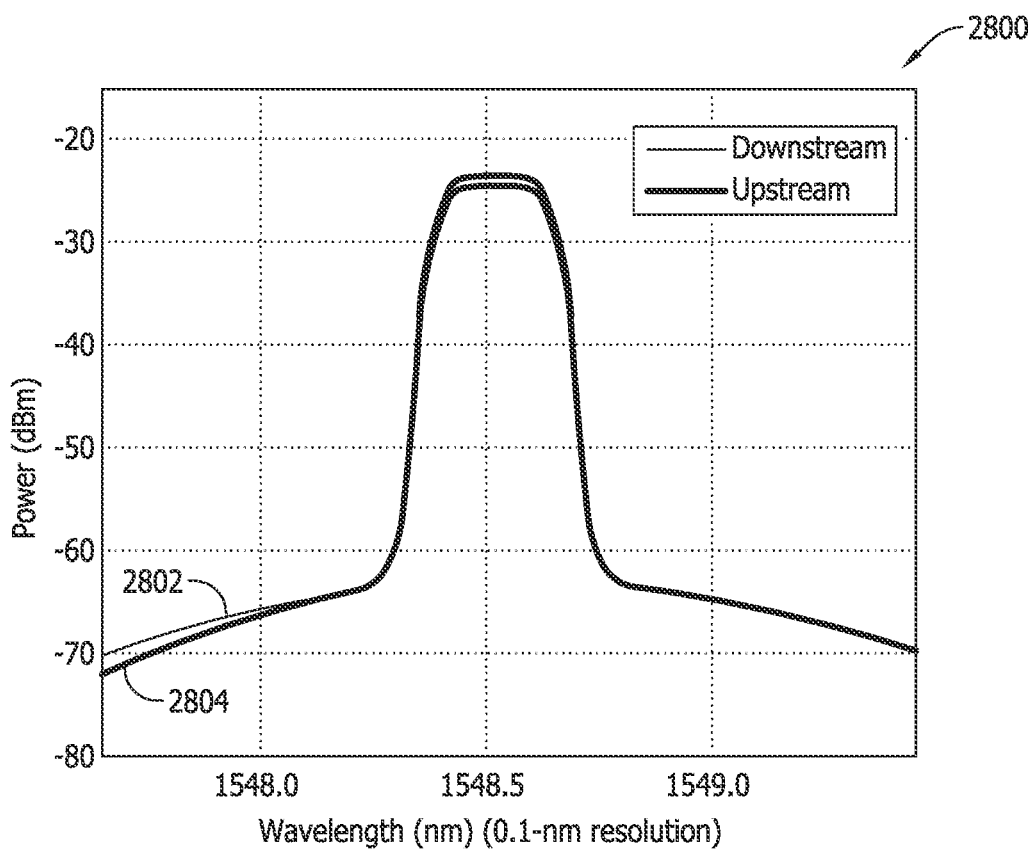
FIG. 28 is a graphical illustration of a comparative optical spectrum plot for a single channel.

FIG. 28 is a graphical illustration depicting a comparative optical spectrum plot 2800 for a single channel. Comparative optical spectrum plot 2800 is representative of power over wavelength for a single channel operation (at 0.1-nm resolution, in this example), and includes a first sub-plot 2802 illustrating the downstream optical spectrum of the single channel, and a second sub-plot 2804 illustrating the upstream optical spectrum of the single channel. As can be seen from the example depicted in FIG. 28, upstream optical spectrum 2804 tracks fairly closely with downstream optical spectrum 2802, with downstream optical spectrum 2802 being slightly greater about a central wavelength (1548.52 nm, in the illustrated example).

Figure 29:
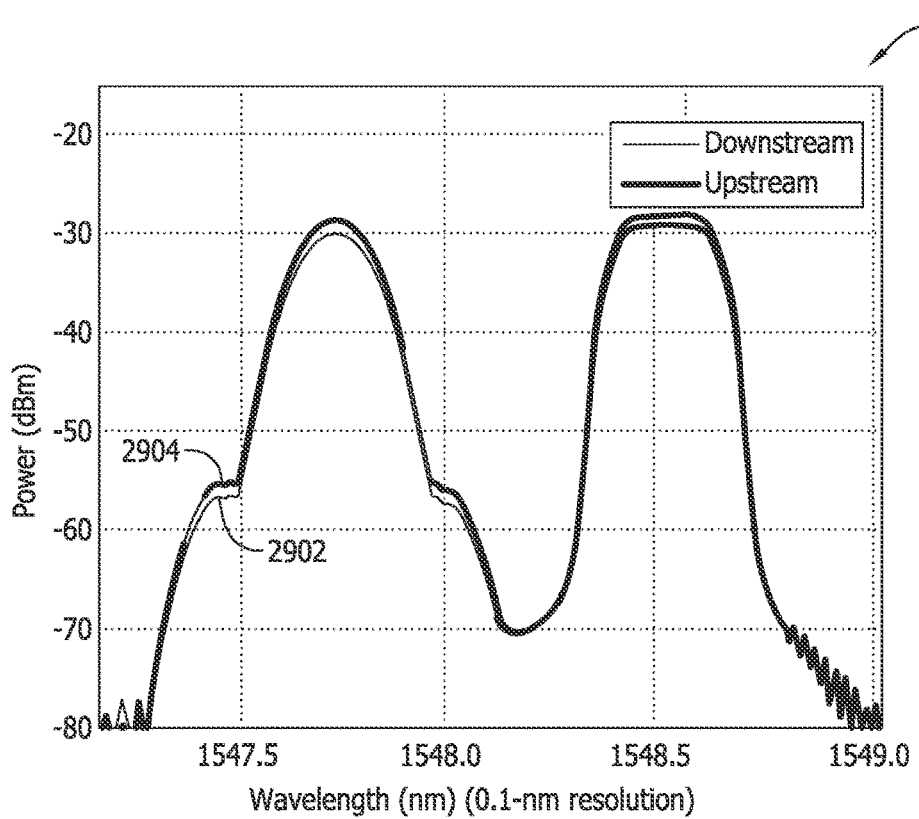
FIG. 29 is a graphical illustration of a comparative optical spectrum plot for a wavelength division multiplexing channel.

FIG. 29 is a graphical illustration depicting a comparative optical spectrum plot 2900 for a WDM channel. Comparative optical spectrum plot 2900 is representative of power over wavelength for a two-wavelength WDM channel operation (e.g., again at 0.1-nm resolution), and includes a first sub-plot 2902 illustrating the downstream optical spectrum of the WDM channel, and a second sub-plot 2904 illustrating the upstream optical spectrum of the WDM channel. As can be seen from the example depicted in FIG. 29, upstream optical spectrum 2904 tracks fairly closely with downstream optical spectrum 2902, however, in this case, downstream optical spectrum 2902 has slightly lower power about the central peak wavelengths of the WDM channel (1547.57 nm and 1548.52 nm, in the illustrated example).

Figure 30:
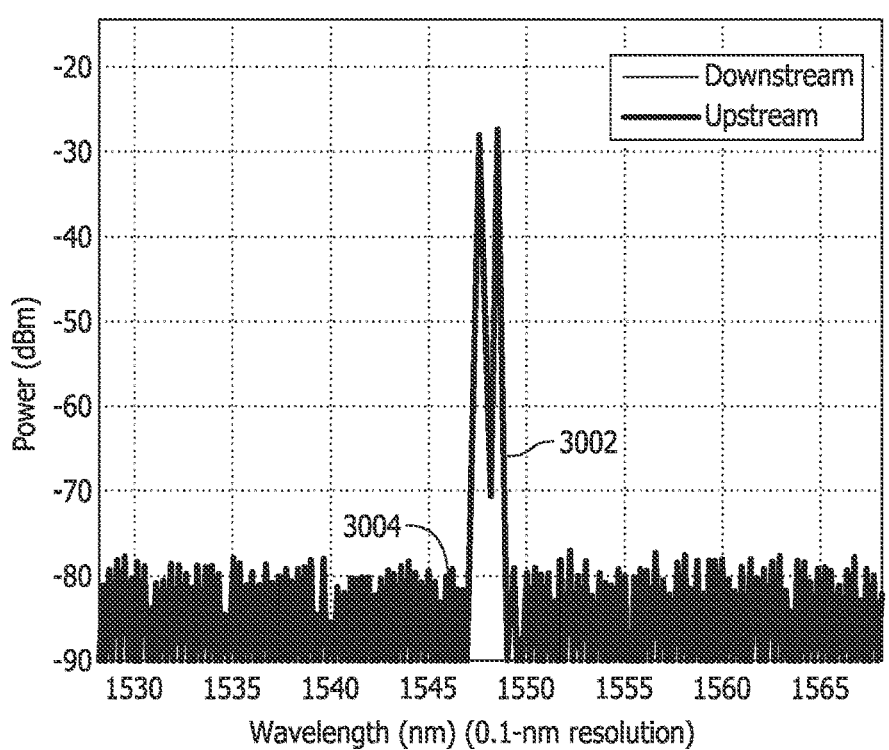
FIG. 30 is a graphical illustration of a comparative optical spectrum plot for a C-Band channel.

FIG. 30 is a graphical illustration depicting a comparative optical spectrum plot 3000 for a C-Band channel. Comparative optical spectrum plot 3000 is representative of power over wavelength for a C-Band channel operation (e.g., again at 0.1-nm resolution), and includes a first sub-plot 3002 illustrating the downstream optical spectrum of the C-Band channel, and a second sub-plot 3004 illustrating the upstream optical spectrum of the C-Band channel. As can be seen from the example depicted in FIG. 30, upstream optical spectrum 3004 tracks fairly closely with downstream optical spectrum 3002 about the central peak wavelengths of the C-Band channel (e.g., 1547.57 nm and 1548.52 nm, in the illustrated example), but upstream optical spectrum 3004 exhibits a considerably higher noise floor outside of the peak wavelengths. The backscattering noise power is described further below with respect to FIGS. 31-35.

Figure 31:
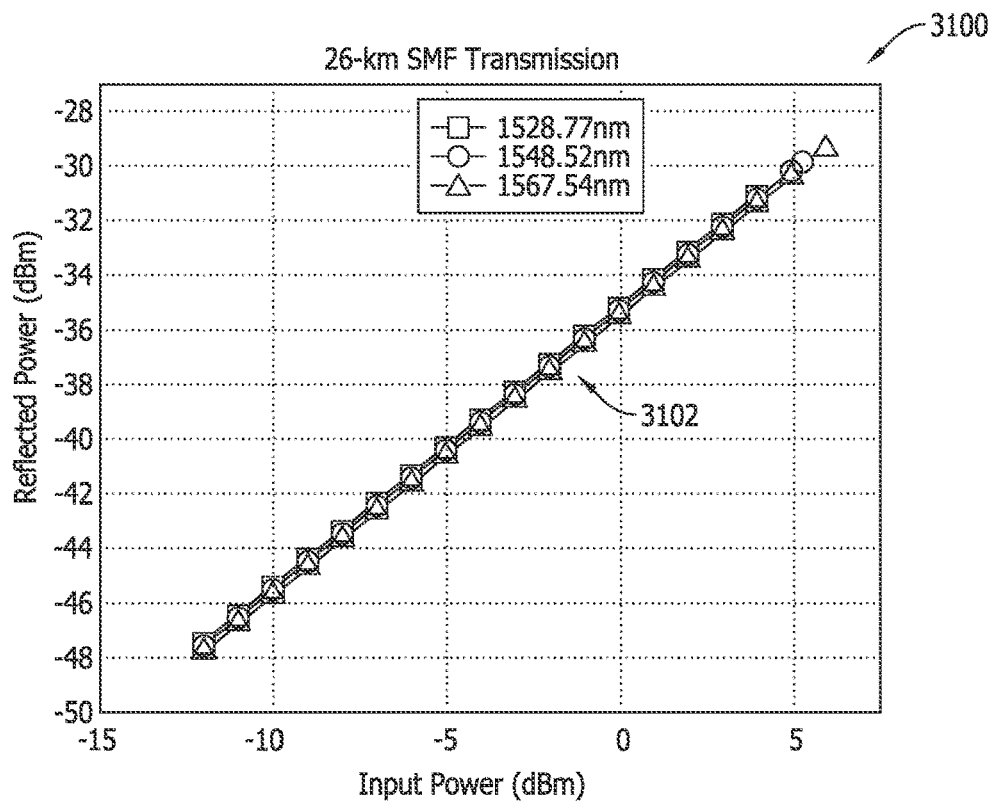
FIG. 31 is a graphical illustration depicting a comparative plot of reflected power against input power.

FIG. 31 is a graphical illustration depicting a comparative plot 3100 of reflected power against input power. Comparative plot 3100 depicts simulated results at a 26-km SMF transmission, and includes sub-plots 3102 representative of the reflection power (e.g., −35 dBm at 0 dBm input power) measured over different wavelengths of 1528.77 nm, 1548.52 nm, and 1567.54 nm, respectively. As can be seen from the example depicted in FIG. 31, the reflected power tracks fairly linearly with the input power, and is substantially agnostic of the various changes to the wavelength.

Figure 32:
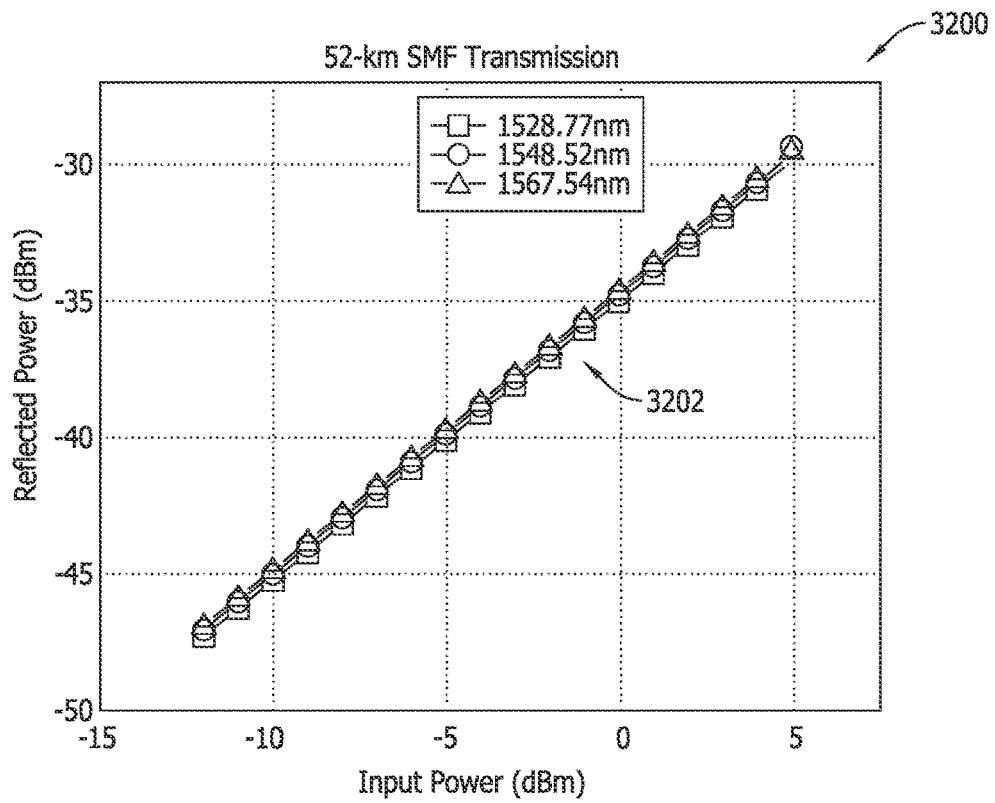
FIG. 32 is a graphical illustration depicting a comparative plot of reflected power against input power.

FIG. 32 is a graphical illustration depicting a comparative plot 3200 of reflected power against input power. Comparative plot 3200 is similar to comparative plot 3100, FIG. 31, however, comparative plot 3200 depicts simulated results at a 52-km SMF transmission, and includes sub-plots 3202 representative of the reflection power (e.g., again −35 dBm at 0 dBm input power) measured over the different wavelengths of 1528.77 nm, 1548.52 nm, and 1567.54 nm, respectively. As can be seen from the example depicted in FIG. 32, the reflected power tracks again fairly linearly with the input power at this larger transmission distance, and remains substantially agnostic of the various changes to the wavelength.

Figure 33:
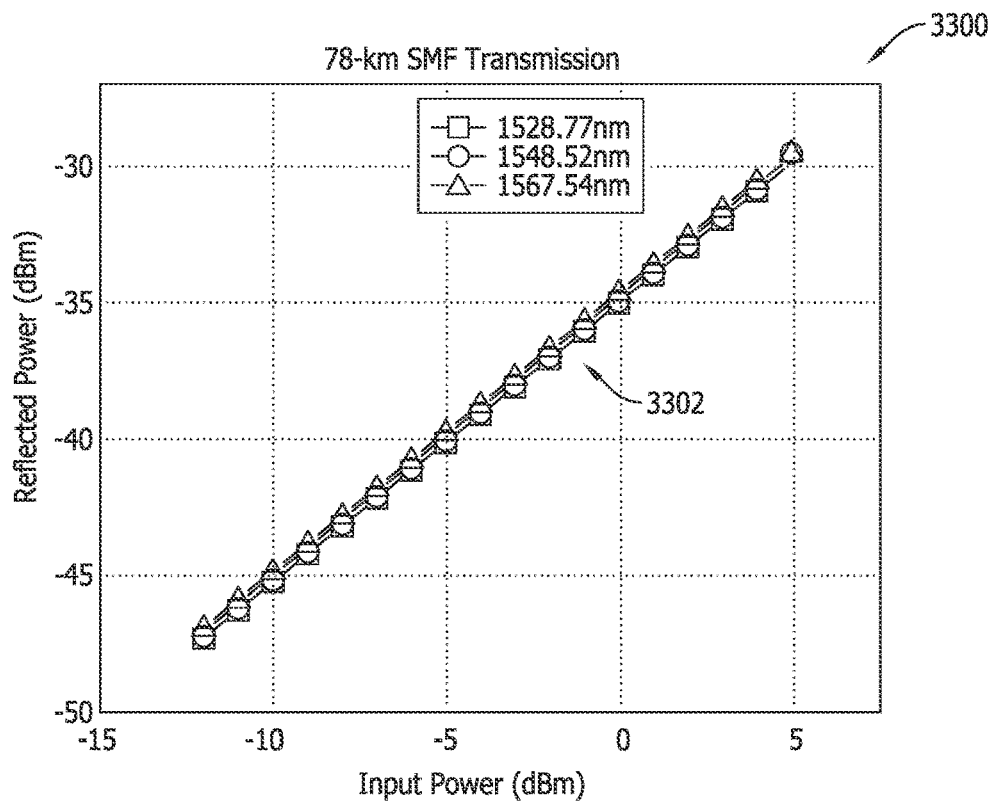
FIG. 33 is a graphical illustration depicting a comparative plot of reflected power against input power.

FIG. 33 is a graphical illustration depicting a comparative plot 3300 of reflected power against input power. Comparative plot 3300 is similar to comparative plot 3100, FIG. 31, however, comparative plot 3300 depicts simulated results at a 78-km SMF transmission, and includes sub-plots 3302 representative of the reflection power (e.g., again −35 dBm at 0 dBm input power) measured over the different wavelengths of 1528.77 nm, 1548.52 nm, and 1567.54 nm, respectively. As can be seen from the example depicted in FIG. 33 as well, the reflected power still tracks fairly linearly with the input power at even larger transmission distances, and continues to remain substantially agnostic of the various changes to the wavelength.

Figure 34:
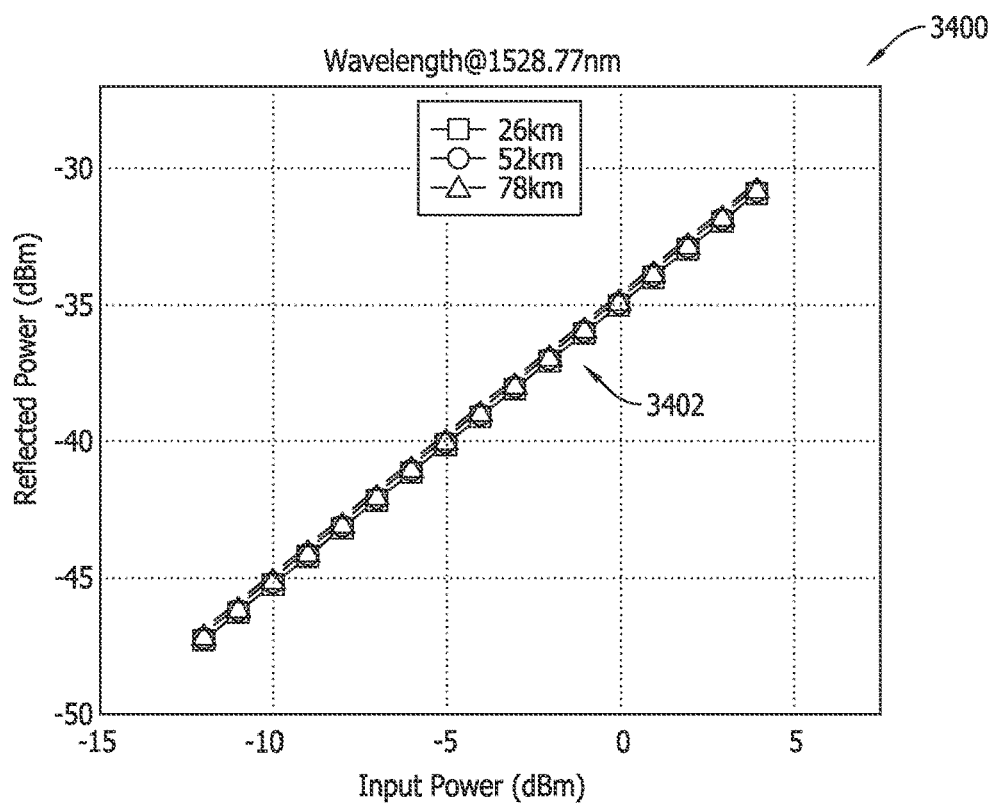
FIG. 34 is a graphical illustration depicting a comparative plot of reflected power against input power.

FIG. 34 is a graphical illustration depicting a comparative plot 3400 of reflected power against input power. Comparative plot 3400 depicts simulated results at the 1528.77 nm wavelength, and includes sub-plots 3402 representative of the −35 dBm reflection power (i.e., at 0 dBm input power) measured over the different transmission distances of 26-km, 52-km, and 78-km, respectively. As can be seen from the example depicted in FIG. 34, the reflected power tracks fairly linearly with the input power, and is substantially agnostic of the various changes to the transmission distances at this wavelength.

Figure 35:
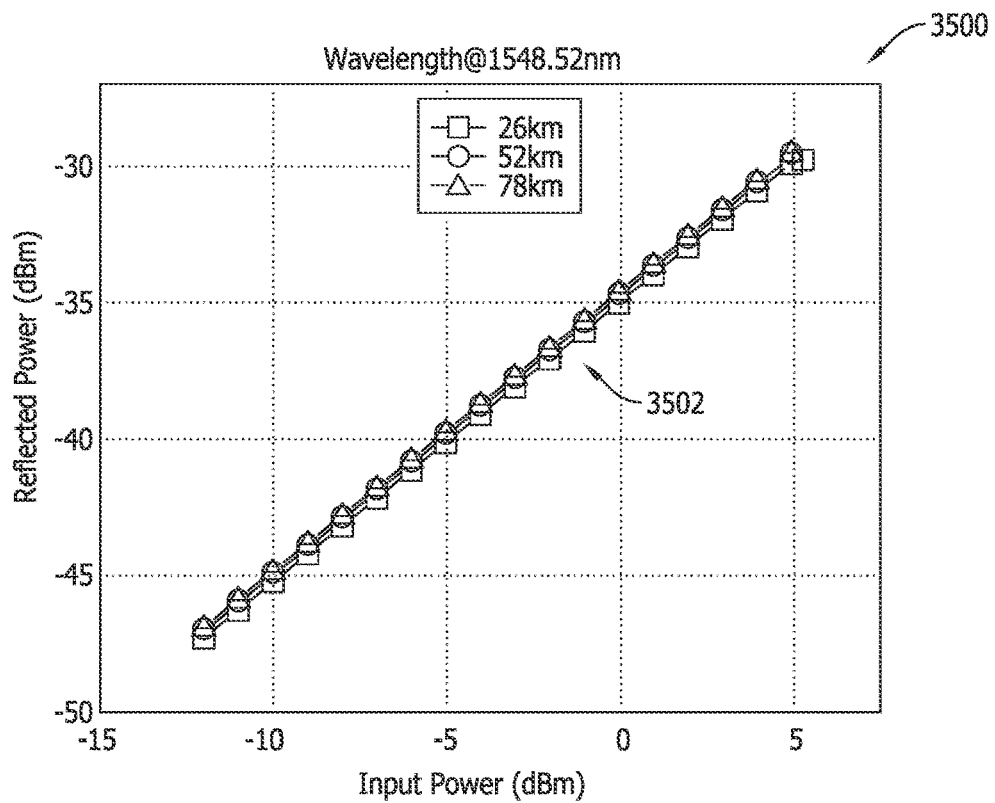
FIG. 35 is a graphical illustration depicting a comparative plot of reflected power against input power.

FIG. 35 is a graphical illustration depicting a comparative plot 3500 of reflected power against input power. Comparative plot 3500 depicts simulated results at the 1548.52 nm wavelength, and includes sub-plots 3502 representative of the −35 dBm reflection power (i.e., at 0 dBm input power) measured over the different transmission distances of 26-km, 52-km, and 78-km, respectively. As can be seen from the example depicted in FIG. 35, the reflected power continues to remain fairly linear with respect to the input power, and is also fairly agnostic of the various changes to the transmission distances at this wavelength. However, a slight separation between the respective subplots 3502 can now be seen at the greater transmission distances.

Figure 36:
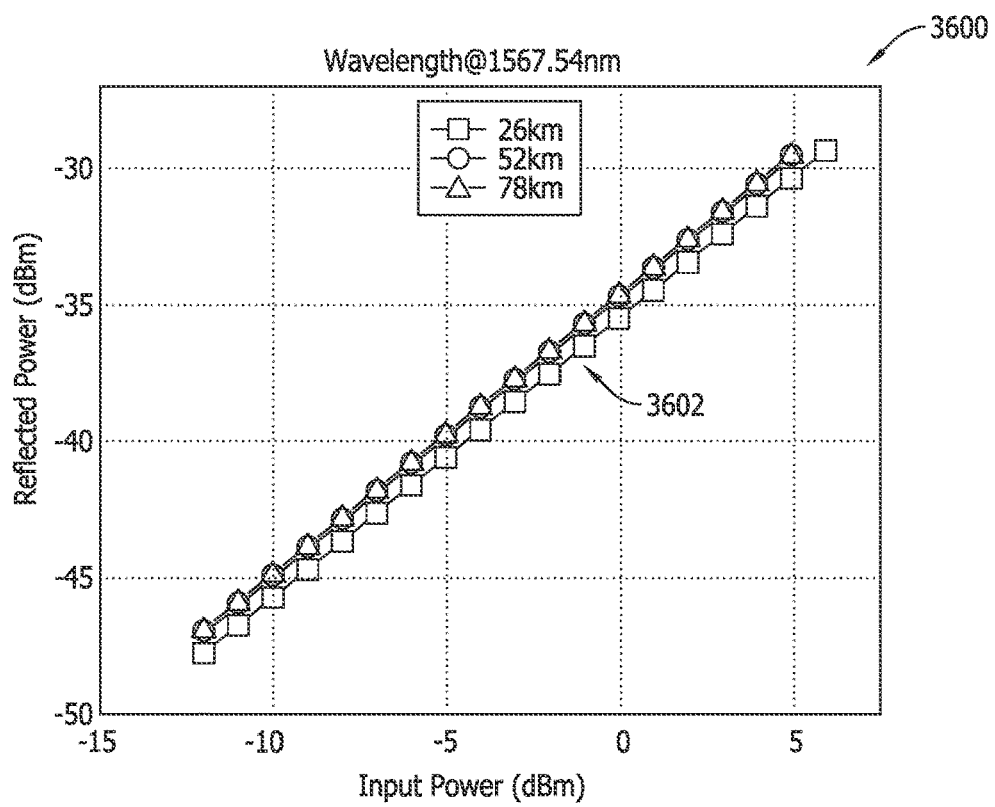
FIG. 36 is a graphical illustration depicting a comparative plot of reflected power against input power.

FIG. 36 is a graphical illustration depicting a comparative plot 3600 of reflected power against input power. Comparative plot 3600 depicts simulated results at the 1567.54 nm wavelength, and includes sub-plots 3602 representative of the −35 dBm reflection power (i.e., at 0 dBm input power) measured over the different transmission distances of 26-km, 52-km, and 78-km, respectively. As can be seen from the example depicted in FIG. 36, the reflected power it is still substantially linear with respect to the input power, and is also somewhat agnostic of the various changes to the transmission distances at this higher wavelength. However, at this higher wavelength, the small separation between the respective subplots 3502 may nevertheless be seen more readily as the transmission distance increases.

The systems and methods described herein are therefore advantageously capable of resolving the deficiencies of conventional coherent transceiver systems that produce significant crosstalk. As described with respect to the embodiments herein, this crosstalk problem is substantially mitigated or essentially eliminated according to the present techniques. According to the innovative embodiments illustrated and described herein, an operator is able to realize significantly improved spectral efficiency (e.g., at least double) of existing fibers, whether for single channel or WDM channel operation, and without requiring significant regard to the transmission distance of the fiber(s), or to the particular wavelength(s) transmitted over the channel(s).

Exemplary embodiments of full duplex coherent optics systems and methods for communication networks are described above in detail. The systems and methods of this disclosure though, are not limited to only the specific embodiments described herein, but rather, the components and/or steps of their implementation may be utilized independently and separately from other components and/or steps described herein.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A full duplex communications network, comprising:
an optical hub including a first coherent optics transceiver;
a fiber node including a second coherent optics transceiver;
an optical transport medium operably coupling the first coherent optics transceiver to the second coherent optics transceiver; and
a first optical circulator disposed at the optical hub and a second optical circulator disposed at the fiber node,
wherein the first coherent optics transceiver is configured to (i) transmit a first optical signal at a first wavelength and a first power level, and (ii) receive a second optical signal at the first wavelength,
wherein the second coherent optics transceiver is configured to (i) receive the first optical signal from the first coherent optics transceiver at the first wavelength, and (ii) transmit the second optical signal at the first wavelength and a second power level,
wherein the first and second optical circulators are configured to separate the first optical signal from the second optical signal at respective opposing ends of the optical transport medium,
wherein the first coherent optics transceiver is further configured to control the first power level such that the first power level is maintained within 5 decibel-milliwatts (dBm) of the second power level, and
wherein the full duplex paradigm is configured for bidirectionality between the first and second coherent optics transceivers such that the first and second optical signals are significantly agnostic of an upstream direction versus a downstream direction.

2. The network of claim 1, wherein the first power level is substantially equal to the second power level.

3. The network of claim 2, wherein a first optical spectrum of the first optical signal is substantially the same as a second optical spectrum of the second optical signal.

4. The network of claim 1, wherein the first power level and the second power level are each 3 dBm.

5. The network of claim 1, wherein the first power level is variable between −5 dBm and −10 dBm, and wherein the second power level is −5 dBm.

6. The network of claim 5, wherein a bit error rate (BER) at the first coherent optics transceiver is variable with the first power level.

7. The network of claim 6, wherein the BER is between 6.67e-6 and 1.9e-3.

8. The network of claim 1, wherein the first power level is −5 dBm, and wherein the second power level is variable between 0 dBm and −5 dBm.

9. The network of claim 8, wherein a first bit error rate (BER) at the first coherent optics transceiver is variable with the second power level.

10. The network of claim 9, wherein the first BER is between 6.67e-6 and 7.35e-4.

11. The network of claim 9, wherein a second BER at the second coherent optics transceiver is variable with the second power level.

12. The network of claim 11, wherein the second BER is between 4.02e-9 and 1.86e-6.

13. The network of claim 1, wherein the first coherent optics transceiver comprises a first receiver portion and a first transmitter portion, wherein the second coherent optics transceiver comprises a second receiver portion and a second transmitter portion, and wherein a reflection power seen at the first and second receiver portions is substantially proportional to an input power at a respective continuous wave source at the first and second coherent optical transceivers.

14. The network of claim 13, wherein the respective reflection power seen at the first and second receiver portions is substantially agnostic of a length of the optical transport medium.

15. The network of claim 14, wherein optical transport medium comprises a single mode fiber.

16. The network of claim 14, wherein the length of the optical transport medium is between 26 and 78 kilometers.

17. The network of claim 14, wherein an optical signal-to-noise ratio (OSNR) penalty of the first and second coherent optics transceivers exponentially increases as a function of multipath interference over the optical transport medium.

18. The network of claim 17, wherein the OSNR penalty decreases with a decrease in a bit error rate (BER) at the respective coherent optics transceiver.

19. The network of claim 1, wherein a first optical spectrum of the first optical signal and a second optical spectrum of the second optical signal are centered within the C-Band channel.

20. The network of claim 19, wherein the first and second optical spectra are centered between 1528 nm and 1568 nm.

* * * * *